United States Patent
Torii et al.

(10) Patent No.: US 7,073,120 B2
(45) Date of Patent: Jul. 4, 2006

(54) STRUCTURED DOCUMENT TRANSFORMATION METHOD, STRUCTURED DOCUMENT TRANSFORMATION APPARATUS, AND PROGRAM PRODUCT

(75) Inventors: Osamu Torii, Kawasaki (JP); Tetsuro Kimura, Tama (JP); Junichi Segawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 438 days.

(21) Appl. No.: 10/151,164

(22) Filed: May 21, 2002

(65) Prior Publication Data

US 2003/0084078 A1 May 1, 2003

(30) Foreign Application Priority Data

May 21, 2001 (JP) .............................. 2001-151603

(51) Int. Cl.
G06F 15/00 (2006.01)

(52) U.S. Cl. .................. 715/513; 715/523; 715/501.1; 715/500

(58) Field of Classification Search ................ 715/513, 715/523, 501.1, 500
See application file for complete search history.

(56) References Cited

U.S. PATENT DOCUMENTS

| | | | |
|---|---|---|---|
| 6,795,868 B1 * | 9/2004 | Dingman et al. ........... 709/246 |
| 2001/0049698 A1 * | 12/2001 | Hsu et al. ................. 707/501.1 |
| 2002/0002566 A1 * | 1/2002 | Gajraj ........................ 707/513 |
| 2002/0016801 A1 * | 2/2002 | Reiley et al. ............... 707/523 |
| 2002/0032706 A1 * | 3/2002 | Perla et al. ................. 707/530 |

FOREIGN PATENT DOCUMENTS

| | | |
|---|---|---|
| JP | 10-232868 | 9/1998 |
| JP | 2000-339307 | 12/2000 |

OTHER PUBLICATIONS

Segawa, J. et al., "The Information Management System Based on XML Bidirectional Transformational Technology", Pan-Yellow-Sea International Workshop on Information Technologies for Network Era, IPSJ, pp. 341-348, (Mar. 7-8, 2002).

(Continued)

Primary Examiner—Stephen Hong
Assistant Examiner—Thu V. Huynh
(74) Attorney, Agent, or Firm—Finnegan, Henderson, Farabow, Garrett & Dunner, L.L.P.

(57) ABSTRACT

A method, apparatus, and computer program product for performing bidirectional transformation between a first structured document and a second structured document is disclosed. A transformation rule having primitive rules each of which is applicable to respective one of elements specified in units of paths within the first structured document is prepared. A forward transformation is performed, which transforms the first structured document into the second structured document in accordance with the transformation rule. At that time, a transformation record is created. The record contains which primitive rules were applied and which paths were transformed in the forward transformation. The transformed second structured document may be edited by an application-side. After that, a backward transformation is performed, which transforms the second structured document into the first structured document with referral to the transformation record, the transformation rule, and the first structured document.

18 Claims, 34 Drawing Sheets

OTHER PUBLICATIONS

Torii, O. et al., "A Bidirectional Transforming Technology for XML Documents", Proc. of 30$^{th}$ IPSJ Sig DD, pp. 1-8, (Sep. 14, 2001).

U.S. Appl. No. 10/151,138, filed May 21, 2002, to Segawa et al.

* cited by examiner

| | |
|---|---|
| Transformation rule R1 | Change path [name/last_name/$1] to path [last_name/$1] |
| Transformation rule R2 | Change path [name/first_name/$1] to path [first_name/$1] |
| Transformation rule R3 | Change path [company/telephone_number/$1] to path [company_telephone_number/$1] |
| Transformation rule R4 | Change path [company/address] to path [address] |
| Transformation rule R5 | Change path [home/telephone_number/$1] to path [home_telephone_number/$1] |
| Transformation rule R6 | Move path [home_telephone_number/$1] to position immediately after path [company_telephone_number/$2] |
| Transformation rule R7 | Delete path [home/address] |

F I G. 5

| | |
|---|---|
| Transformation record M1 | Transformation rule R1 was applied to paths which hold element identifiers [member1-2] and [member2-2] as last elements |
| Transformation record M2 | Transformation rule R2 was applied to paths which hold element identifiers [member1-3] and [member2-3] as last elements |
| Transformation record M3 | Transformation rule R3 was applied to paths which hold element identifiers [member1-5] and [member2-5] as last elements |
| Transformation record M4 | Transformation rule R4 was applied to paths which hold element identifiers [member1-6] and [member2-6] as last elements |
| Transformation record M5 | Transformation rule R5 was applied to paths which hold element identifiers [member1-12] and [member2-12] as last elements |
| Transformation record M6 | Transformation rule R6 was applied to paths which hold element identifiers [member1-12] and [member2-12] as last elements |
| Transformation record M7 | Transformation rule R7 was applied to paths which hold element identifiers [member1-13] and [member2-13] as last elements |

F I G. 6

```
<Address_book id="root">
  <Member id="member1">
    <Name id="member1-1">
      <Last_name id="member1-2">A1</Last_name>
      <First_name id="member1-3">A2</First_name>
    </Name>
    <Company id="member1-4">
      <Telephone_number id="member1-5">111-111-1111</Telephone_number>
      <Address id="member1-6">
        <Postal_code id="member1-7">111-1111</Postal_code>
        <Province id="member1-8">A3</Province>
        <City id="member1-9">A4</City>
        <Block_number id="member1-10">1-1</Block_number>
      </Address>
    </Company>
    <Home id="member1-11">
      <Telephone_number id="member1-12">111-111-2222</Telephone_number>
      <Address id="member1-13">
        <Postal_code id="member1-14">111-2222</Postal_code>
        <Province id="member1-15">A5</Province>
        <City id="member1-16">A6</City>
        <Block_number id="member1-17">1-2</Block_number>
      </Address>
    </Home>
  </Member>
  <Member id="member2">
    ......
  </Member>
</Address_book>
```

FIG. 7

```
<Address_book id="root"><Member id="member1">
  <Name id="member1-1"><Last_name id="member1-2">A1</Last_name></Name>
  <Name id="member1-1"><First_name id="member1-3">A1</First_name></Name>
  <Company id="member1-4"><Telephone_number id="member1-5">111-111-1111</Telephone_number></Company>
  <Company id="member1-4"><Address id="member1-6">
    <Postal_code id="member1-7">111-1111</Postal_code>
    <Province id="member1-8">A3</Province>
    <City id="member1-9">A4</City>
    <Block_number id="member1-10">1-1</Block_number>
  </Address></Company>
  <Home id="member1-11"><Telephone_number id="member1-12">111-111-2222</Telephone_number></Home>
  <Home id="member1-11"><Address id="member1-13">
    <Postal_code id="member1-14">111-2222</Postal_code>
    <Province id="member1-15">A5</Province>
    <City id="member1-16">A6</City>
    <Block_number id="member1-17">1-2</Block_number>
  </Address></Home>
</Member></Address>
<Address_book id="root"><Member id="member2">
  ......
</Member></Address_book>
```

F I G. 8

```
<Address_book id="root"><Member id="member1">
<Last_name id="member1-2">A1</Last_name>
<First_name id="member1-3">A2</First_name>
<Company_telephone_number id="member1-5">111-111-1111</Company_telephone_number>
<Home_telephone_number id="member1-5">111-111-2222</Home_telephone_number>
<Address id="member1-6">
    <Postal_code id="member1-7">111-1111</Postal_code>
    <Province id="member1-8">A3</Province>
    <City id="member1-9">A4</City>
    <Block_number id="member1-10">1-1-1</Block_number>
</Address>
</Member></Address_book>
<Address_book id="root"><Member id="member2">
       ......
</Member></Address_book>
```

FIG. 9

```
1  <Address_book id="root">
2    <Member id="member1">
3      <Last_name id="member1-2">A1</Last_name>
4      <First_name id="member1-3">A2</First_name>
5      <Company_telephone_number id="member1-5">111-111-1111</Company_telephone_number>
6      <Home_telephone_number id="member1-5">111-111-2222</Home_telephone_number>
7      <Address id="member1-6">
8        <Postal_code id="member1-7">111-1111</Postal_code>
9        <Province id="member1-8">A3</Province>
10       <City id="member1-9">A4</City>
11       <Block_number id="member1-10">1-1</Block_number>
12     </Address>
13   </Member>
14   <Member id="member2">
       ……
15   </Member>
16 <Address_book>
```

FIG. 12

```
<Address_book id="root">
  <Member id="member1">
    <Last_name id="member1-2">A1</Last_name>
    <First_name id="member1-3">A2</First_name>
    <Company_telephone_number id="member1-5">111-111-1111</Company_telephone_number>  ⎫
    <Home_telephone_number id="member1-5">111-111-2222</Home_telephone_number>         ⎬ Rewrite value
    <Address id="member1-6">                                                            ⎭
      <Postal_code id="member1-7">111-1111</Postal_code>
      <Province id="member1-8">A3</Province>
      <City id="member1-9">A4</City>
      <Block_number id="member1-10">1-1</Block_number>
    </Address>
  </Member>
  <Member id="member2">
    ......
  </Member>    ⎫ Add
  <Member>
    ......
  </Member>    ⎫ Add
  <Member>
    ......
  </Member>
</Address_book>
```

FIG. 13

Difference information

```
<Address_book id="root">
  <Member id="member1">
    <Company id="member1-4">
      <Address id="member1-6">
        <Postal_code id="member1-7">111-3333</Postal_code>
        <Province id="member1-8">A5</Province>
        <City id="member1-9">A6</City>
        <Block_number id="member1-10">1-3</Block_number>
      </Address>
    </Company>
    ......
  </Member>
  <Member>
    ......
  </Member>
  <Member>
  </Member>
<Address_book>
```

FIG. 17

| Document structure | Structured document browse/edit apparatus | Transformation rule set |
|---|---|---|
| Address book | TE 1 | R (Address book, TE 1) |
| | TE 2 | R (Address book, TE 2) |
| | ⋮ | ⋮ |
| Schedule | TE 1 | R (Schedule, TE 1) |
| | TE 2 | R (Schedule, TE 2) |
| | ⋮ | ⋮ |

| Transformation rule group G1 | Priority | Transformation rule R201 | Change path [company/address/$1] to [address/$1] |
|---|---|---|---|
| | | Transformation rule R202 | Change path [home/address/$1] to [address/$1] |

F I G. 21

FIG. 22A  Personal information (pi1)
├─ Name (pi2)
├─ E-mail (pi3, T)
└─ Telephone number (pi4, F)

↓ Forward transformation of document structure

FIG. 22B  Personal information (pi1)
├─ Name (pi2)
└─ E-mail (pi3)

↓ Edit

FIG. 22C  Personal information (pi1)
├─ Name (pi2)
└─ Telephone number

↓ Inverse transformation (transformation record M304)

FIG. 22D  Personal information (pi1)
├─ Name (pi2)
├─ Telephone number
└─ Telephone number (pi4, F)

↓ Inverse transformation (transformation record M303)

FIG. 22E  Personal information (pi1)
├─ Name (pi2)
├─ Telephone number (T)
└─ Telephone number (pi4, F)

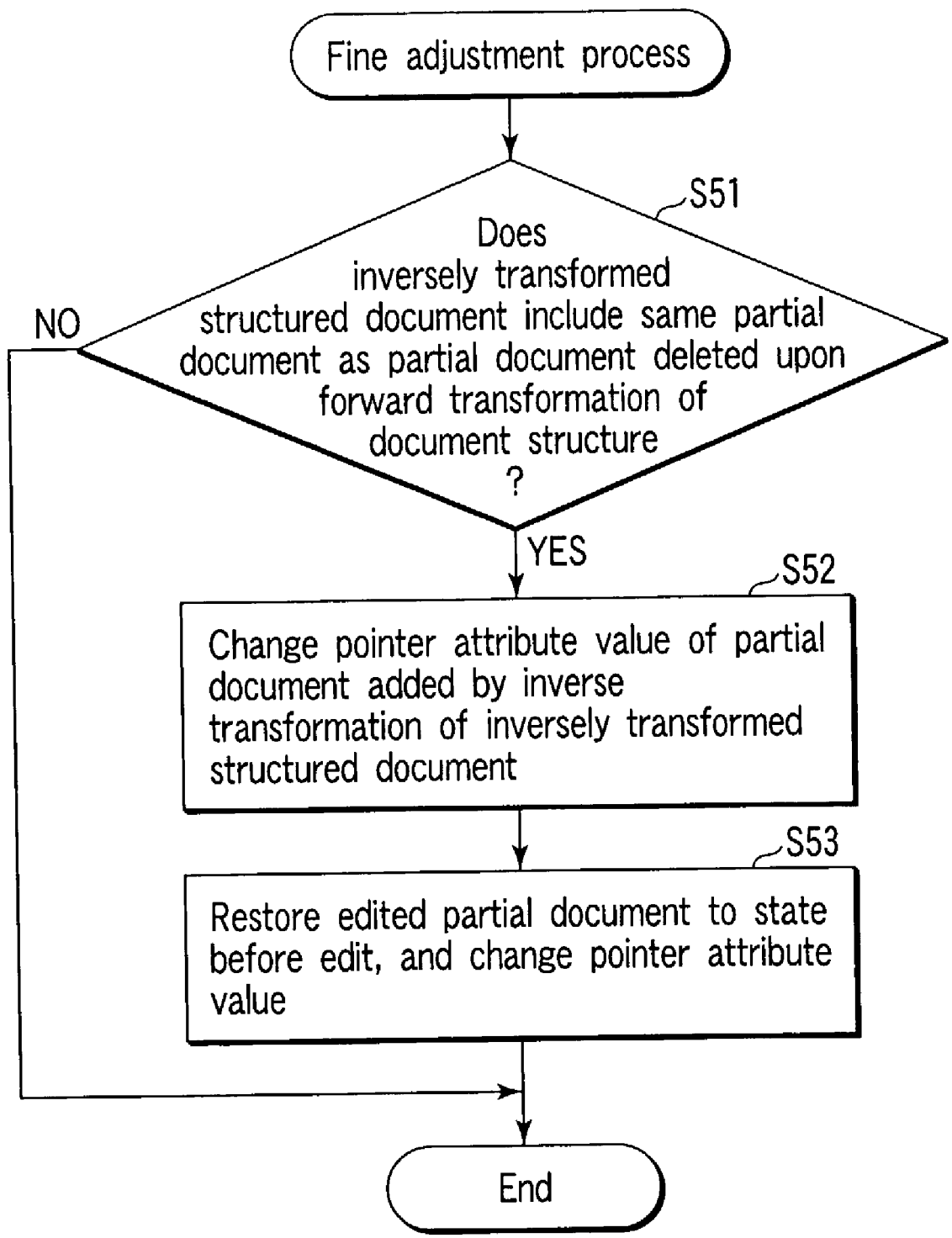
F I G. 24

| | | |
|---|---|---|
| | Transformation rule R401 | Change path [company (display="true") /address/$1] to path [company/address/$1] |
| | Transformation rule R402 | Delete path [company (display="false") /address /$1] |
| | Transformation rule R403 | Change path [home (display="true") /address/$1] to path [home/address/$1] |
| | Transformation rule R404 | Delete path [home (display="false") /address/$1] |
| Priority | Transformation rule R405 | Change path [e-mail/$1] to [contact address/$1] |
| Transformation rule group G5 | Transformation rule R406 | Change path [portable phone number/$1] to [contact address/$1] |

F I G. 25

| | |
|---|---|
| Transformation record M401 | Transformation rule R401 was applied to path including element with identifier [member1-3] as last element |
| Transformation record M402 | Transformation rule R402 was applied to path including element with identifier [member2-3] as last element |
| Transformation record M403 | Transformation rule R403 was applied to path including element with identifier [member2-5] as last element |
| Transformation record M404 | Transformation rule R404 was applied to path including element with identifier [member1-5] as last element |
| Transformation record M405 | Transformation rule R405 was applied to path including element with identifier [member1-6] as last element |
| | Transformation rule R406 was applied to path including element with identifier [member2-6] as last element |

F I G. 26

```
<Address_book id="root">
    <Member id="member1">
        <Name id="member1-1">A1</Name>
        <Company id="member1-2" Display="F">
            <Address id="member1-3">A2</Address>
        </Company>
        <Home id="member1-4" Display="F">
            <Address id="member1-5">A3</Address>
        </Home>
        <E-mail id="member1-6">A4</E-mail>
    </Member>
    <Member id="member2">
        <Name id="member2-1">B1</Name>
        <Company id="member2-2" Display="F">
            <Address id="member2-3">B2</Address>
        </Company>
        <Home id="member2-4" Display="F">
            <Address id="member2-5">B3</Address>
        </Home>
        <Portable_phone_number id="member2-6">111-1111-1111</Portable_phone_number>
    </Member>
</Address_book>
```

FIG. 27

```
<Address_book id="root"><Member id="member1">
    <Name id="member1-1">A1</Name>
    <Company id="member1-2"><Address id="member1-3">A2</Address></Company>
    <Contact address id="member1-6">A4</Contact address>
</Member></Address_book>
<Address_book id="root"><Member id="member2">
    <Name id="member2-1">B1</Name>
    <Company id="member2-4"><Address id="member2-5">B3</Address></Company>
    <Contact address id="member2-6">111-1111-1111</Contact address>
</Member></Address_book>
```

F I G. 29

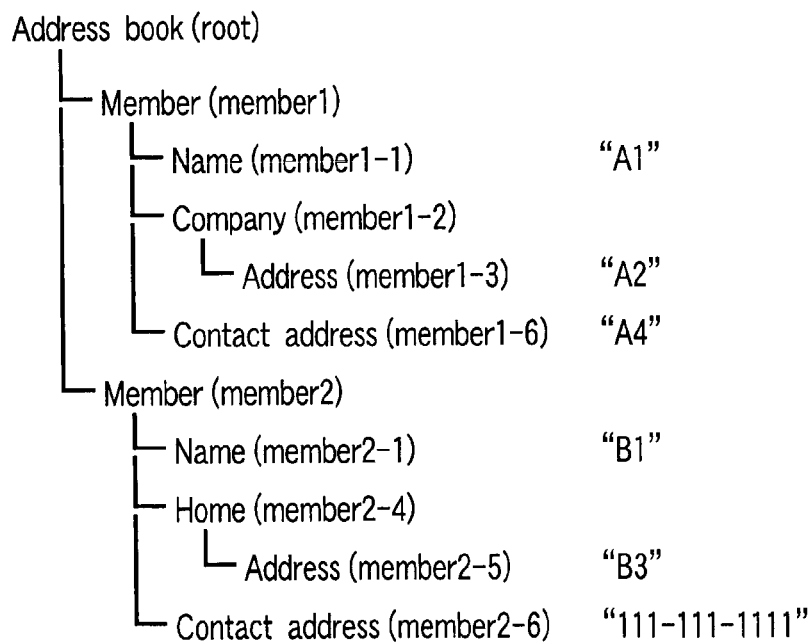

F I G. 30

```
<Address_book id="root">
    <Member id="member1">
        <Name id="member1-1">A1</Name>
        <Company id="member1-2" Display="F">
            <Address id="member1-3">A2</Address>
        </Company>
        <Home id="member1-4" Display="T">
            <Address id="member1-5">A3</Address>
        </Home>
        <E-mail id="member1-6">A4</E-mail>
    </Member>
    <Member id="member2">
        <Name id="member2-1">B1</Name>
        <Company id="member2-2" Display="F">
            <Address id="member2-3">B2</Address>
        </Company>
        <Home id="member2-4" Display="T">
            <Address id="member2-5">B3</Address>
        </Home>
        <Portable_phone_number id="member2-6">111-1111-1111</Portable_phone_number>
    </Member>
    <Member id="member3">
        <Name id="member3-1">C1</Name>
        <Company id="member3-2" Display="T">
            <Address id="member3-3">C3</Address>
        </Company>
        <E-mai id="member3-4" Display="T">C4</E-mail>
    </Member>
    <Member id="member4">
        <Name id="member4-1">D1</Name>
        <Company id="member4-2" Display="T">
            <Address id="member4-3">D3</Address>
        </Company>
        <E-mai id="member4-4" Display="T">222-2222-2222</E-mail>
    </Member>
</Address_book>
```

FIG. 36

STRUCTURED DOCUMENT TRANSFORMATION METHOD, STRUCTURED DOCUMENT TRANSFORMATION APPARATUS, AND PROGRAM PRODUCT

CROSS-REFERENCE TO RELATED APPLICATIONS

This application is based upon and claims the benefit of priority from the prior Japanese Patent Application No. 2001-151603, filed May 21, 2001, the entire contents of which are incorporated herein by reference.

BACKGROUND OF THE INVENTION

1. Field of the Invention

The present invention relates to a transformation technique of the document structure of a structured document such as an XML document or the like.

2. Description of the Related Art

Along with the popularization of electric appliances in recent years, a single user often possesses a plurality of different terminals such as a desktop personal computer, notebook personal computer, PDA (Personal Digital Assistant), portable phone, and the like. Various kinds of information to be processed by these terminals contain many closely related data, and an address book is a typical example of such data.

Address book information managed by these terminals normally includes the last names, first names, addresses, telephone numbers, e-mail addresses, and the like. These pieces of information must indicate the same contents even if the terminals use different data formats. When a certain person registered in an address book has moved, and has changed his or her telephone number, it must be possible to browse a new telephone number independently of the type of terminal (desktop personal computer, notebook personal computer, PDA, or portable phone) used upon browsing information of that person. If the address book is absolutely independently managed by the desktop personal computer, notebook personal computer, PDA, and portable phone, when registered personal information has changed, information must be updated for each terminal. Hence, management becomes more complicated with increasing number of terminals, and it becomes difficult to maintain consistency of information.

To solve this problem, various systems, in which a server computer intensively and simultaneously manages various kinds of information, which are independently managed by a plurality of different terminals (e.g., desktop personal computer, notebook personal computer, PDA, portable phone, and the like), and information is read out from the server computer to each terminal when it is used, have been proposed.

A merit obtained upon introducing such system is to relatively easily maintain consistency of information since various kinds of information are simultaneously managed on the server computer. If address book information is simultaneously managed by the server computer, even when personal information has changed, the user can acquire consistent, latest information without updating information for respective terminals by reading out the address book information from the server computer at each individual terminal, as long as only information on the server computer is updated (via the terminal).

Data which is intensively stored in the server computer is obtained by organizing those used at a plurality of terminals. In general, data used by all types of terminals rarely conforms with an identical data format, and all of data used at all types of terminals are rarely identical. For example, a portable phone and PDA use different data formats of address book information. Furthermore, the portable phone uses only name and telephone number data in the address book information, while the PDA also uses address and e-mail address data in addition to the name and telephone number data.

Hence, in order to read out information stored in the server computer and to use readout information at a terminal, information must be transformed into a format and contents suitable for each terminal.

In this manner, in a system in which a server computer simultaneously manages various kinds of information used at a plurality of terminals, and information is read out from the server computer to each terminal when it is used, terminals that the user can use are limited to specific devices, and transformation programs specialized for respective devices are used to transform information stored in the server computer into a format that a terminal can use, or to transform information stored in a terminal into a format that the server computer can store. With this method, a new program must be created every time a new terminal is added, resulting in complicated maintenance of the system.

In case of a structured document expressed by an XML document format, transformation using a stylesheet based on XSL (Extensible Stylesheet Language) is prevalently used to transform the document structure of such structured document (XSLT).

If structured documents are selected as targets in the aforementioned system in which the server computer simultaneously manages various kinds of information used at a plurality of terminals, and information is read out from the server computer to each terminal when it is used, a mechanism for transforming an XML document to obtain another structured document by creating only a new transformation rule in place of a new program can be provided, if XSLT is used. However, XSLT is suitable for transforming an XML document to obtain another structured document, but it requires a complicated transformation rule. Also, it is very difficult to make backward transformation from a new structured document obtained using rules used in transformation into an XML document that conform with the document structure of an XML document before transformation.

In this way, when document information simultaneously managed by a server of a server-client system is read out from various terminals when it is used, the server manages document information using one format. Upon using the document information on the client side, the formats (document structures) of the document information differ depending on terminals. In such case, in order to bidirectionally transform document information between a document format (document structure) compatible to the server side and those compatible to respective clients using transformation programs and the like, a new transformation program must be created every time a terminal is added as a new client. Since such transformation program must be created, the types of terminals that can be used are limited. Hence, maintenance upon adding a terminal as a client is not easy.

When structured documents described in XML or the like are selected as objects to be processed, transformations from a document structure compatible to the server to those compatible to respective clients can be made using XSLT, but backward transformation is not available.

BRIEF SUMMARY OF THE INVENTION

The present invention has been made in consideration of the aforementioned problems, and has as its object to provide a document structure transformation method which can easily attain bidirectional transformation between a document structure compatible to the server side and those compatible to respective clients upon reading out document information simultaneously managed by the server from various terminals as clients when it is used, a document structure transformation apparatus using that method, and a program product.

According to one aspect of the present invention, there is provided a structured document transforming method for performing bidirectional transformation between a first structured document and a second structured document, wherein the first structured document and the second structured document each includes elements, comprising: preparing a transformation rule having primitive rules each of which is applicable to respective one of the elements specified in units of paths within the first structured document; performing a forward transformation which transforms the first structured document into the second structured document in accordance with the transformation rule; creating a transformation record wherein which primitive rules were applied and which paths were transformed in the forward transformation are recorded; editing the second structured document; and performing a backward transformation which transforms the second structured document into the first structured document while referring to the transformation record, the transformation rule, and the first structured document.

BRIEF DESCRIPTION OF THE SEVERAL VIEWS OF THE DRAWING

FIG. 5 shows an example of a transformation rule set;

FIG. 6 shows an example of transformation records;

FIG. 7 shows an example of an XML document;

FIG. 8 shows an XML document as a result obtained when the XML document shown in FIG. 7 undergoes a pre-process for rewriting to a description format suitable for transformation using transformation rules;

FIG. 9 shows the transformation result of a document structure upon applying transformation rules;

FIG. 12 shows an XML document as a result obtained when the XML document with the transformed document structure undergoes a post-process for rewriting to a description format suitable for browsing and editing at the structured document browse/edit apparatus;

FIG. 13 shows an XML document as a result of an edit process for changing the value of an element "address" as a child element of an element with element identifier "member1", and an edit process for adding two new members;

FIG. 17 shows an example of a difference document to be sent from the structured document transformation apparatus to a structured document distribution apparatus;

FIG. 21 shows a storage example of a transformation rule group;

FIGS. 22A, 22B, 22C, 22D, and 22E are views for explaining the intended use of a pointer attribute;

FIG. 24 is a flow chart for explaining a fine adjustment process;

FIG. 25 shows a storage example of a transformation rule set;

FIG. 26 shows a storage example of transformation records;

FIG. 27 shows an example of an XML document stored in a storage unit;

FIG. 29 shows an XML document obtained as a result of transformation of the document structure by applying the transformation rule set shown in FIG. 25 to the XML document shown in FIG. 27;

FIG. 30 shows the document structure of the XML document shown in FIG. 29;

FIG. 36 shows an example of an XML document which is finally stored in a structured document distribution apparatus and in which identifiers are assigned to all elements.

DETAILED DESCRIPTION OF THE INVENTION

Figure 1:
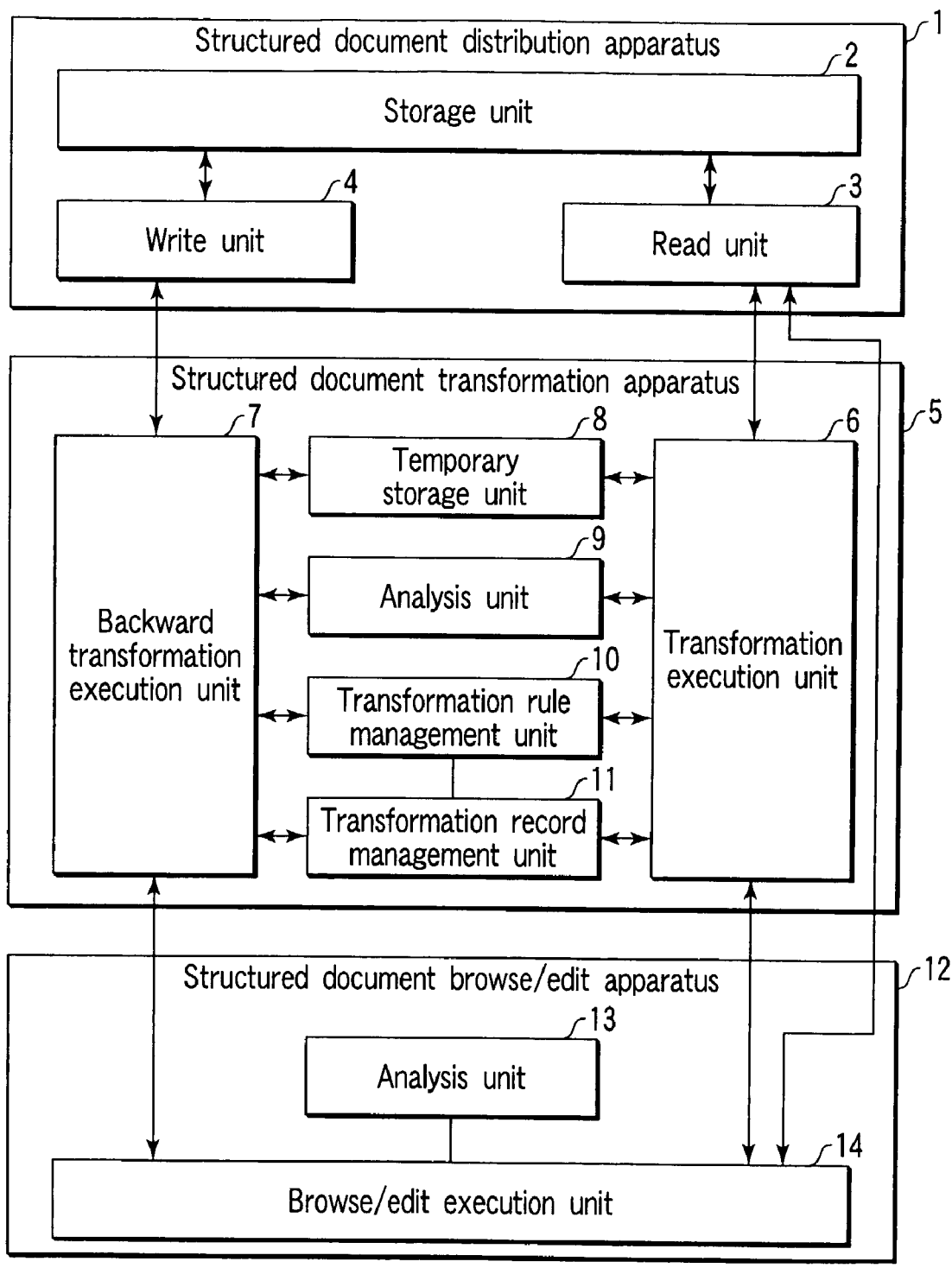
FIG. 1 is a block diagram showing an example of the arrangement of a structured document management system according to the first embodiment of the present invention.

Embodiments of the present invention will be described hereinafter with reference to the accompanying drawings.

FIRST EMBODIMENT

As standard document formats exchanged via a communication path such as the Internet, intranet, or the like in recent years, HTML documents, XML documents, and the like are known. For details of HTML documents, refer to HTML 4.01 Specification W3C Recommendation 24 Dec. 1999. For details of XML documents, refer to Extensible Markup Language (XML) 1.0 (Second Edition) W3C Recommendation 6 Oct. 2000. These documents are examples of structured documents. In the following embodiments of the present invention, a case will be exemplified wherein an XML document as an example of structured documents is selected as an object to be processed.

An XML document will be briefly explained first.

An XML document has a hierarchical document structure made up of elements (or building elements). Each of all elements of the XML document except for a special element called a root holds only one parent element, and may hold one or a plurality of child elements. The parent-child relationship among elements forms the hierarchical structure of the XML document.

For example, XML data (XML document) that expresses "address book" information is as follows:

```
<address_book>
    <member>
        <name>Taro Yamada</name>
        <mail>yamada@taiyo-tusin.com</mail>
        <office>Taiyo Tusin</office>
    </member>
    <member>
        <name>Hanako Suzuki</name>
        <mail>hanako@kanagawa-gas.co.jp</mail>
        <office>Kanagawa Gas</office>
    </member>
</address_book>
```

The above XML document has a document structure in which a building element (node) "address book" has a plurality of child elements "member", and each element "member" has child elements "name", "mail", and "office". Each building element is bounded by tags (<element name>) that represents the element name.

For example, assume that identification information of the aforementioned document structure of the above document data, i.e., "address book" information, is "address book".

XML uses tags to express a document structure. The tags include start and end tags. By bounding each building element which forms a document structure by start and end tags, a character string (text) delimiter in a document and a building element to which that text belongs in terms of a structure can be clearly described.

Note that a start tag is defined by closing an element name by "<" and ">", and an end tag is defined by closing an element name by "</" and ">". The contents of a building element that follows a tag are text (character string) or repetition of a child building element. Also, the start tag can be set with attribute information like "<element name attribute="attribute value">".

In this embodiment, "address book/member" is used to designate the data range that contains element "member" as one of child elements of tag "address book" and its child elements, and "address book/member/name" is used to designate element "name" as a child element of "member". Such expressions used to designate specific areas in the structured document on the basis of its document structure will be referred to as paths, and "address book/member", "address book/member/name", and the like will be referred to as path names.

Likewise, a path for designating an element having an element value "Kanagawa Gas" can be expressed by "address book/member/office/Kanagawa Gas".

Also, a specific area in a structured document designated by such path will be referred to as a partial document of that structured document. The partial document contains elements and their values. For example, in case of a partial document including "member", that partial document indicates the range including child elements of "member" and their values.

FIG. 1 shows an example of the arrangement of a structured document management system according to an embodiment of the present invention. XML documents will be assumed as structured documents.

The structured document management system shown in FIG. 1 roughly comprises three apparatuses, i.e., a structured document distribution apparatus 1, structured document transformation apparatus 5, and structured document browse/edit apparatus 12.

The structured document distribution apparatus 1 and structured document transformation apparatus 5 may be used in two different arrangements. That is, these apparatuses may be built in a single apparatus to implement their functions, or may be coupled via a network as independent apparatuses.

Likewise, the structured document transformation apparatus 5 and structured document browse/edit apparatus 12 may be used in two different arrangements. That is, these apparatuses may be built in a single apparatus, or may be coupled via a network as independent apparatuses.

For example, the functions of the structured document distribution apparatus 1 and structured document transformation apparatus 5 may be provided to a server apparatus, and the function of the structured document browse/edit apparatus 12 may be provided to a client terminal. In this case, the arrangement of the server apparatus includes those of the structured document distribution apparatus 1 and structured document transformation apparatus 5, and the client terminal includes the arrangement of the structured document browse/edit apparatus 12.

Or the function of the structured document distribution apparatus 1 may be provided to a server apparatus, and the functions of the structured document transformation apparatus 5 and structured document browse/edit apparatus 12 may be provided to a client terminal. In such case, the arrangement of the server apparatus includes that of the structured document distribution apparatus 1, and the client terminal includes the arrangements of the structured document transformation apparatus 5 and structured document browse/edit apparatus 12.

The structured document distribution apparatus 1 comprises a storage unit 2, read unit 3, and write unit 4.

The storage unit 2 stores a plurality of XML documents with different document structures.

The read unit 3 reads out an XML document from the storage unit 2, and sends the readout XML document to the structured document transformation apparatus 5. Since the storage unit 2 normally stores a plurality of XML documents, the read unit 3 selects and reads out an appropriate XML document (which is requested by the user using the structured document browse/edit apparatus 12) to be sent to the structured document transformation apparatus 5 from these plurality of XML documents. Note that the read unit 3 may read out either a full XML document or only the difference between an XML document previously read out from the storage unit 2, and an XML document which is read out currently. The read unit 3 appropriately determines if information to be read out is a full XML document or only a difference of an XML document.

The write unit 4 receives an XML document sent from the structured document transformation apparatus 5, and stores the received XML document in the storage unit 2. Note that the write unit may receive either a full XML document or only a difference from an XML document previously read out from the storage unit 2.

The write unit 4 makes appropriate write access depending on whether the received information is a full XML document or only a difference of an XML document. Since the storage unit 2 normally stores a plurality of XML documents, the write unit 4 selects an appropriate XML document corresponding to that sent from the structured document transformation apparatus 5 from these plurality of XML documents, and updates the selected XML document in accordance with the contents of the XML document sent from the structured document transformation apparatus 5.

Note that all building elements of XML documents stored in the storage unit 2 in the structured document management system shown in FIG. 1 are assigned identifiers used to uniquely identify each individual building element. Of building elements of an XML document sent from the structured document transformation apparatus 5, those newly created on the structured document browse/edit apparatus 12 (to be described later) by the user are assigned no identifiers. Hence, the write unit 4 assigns identifiers to those elements having no identifiers.

The structured document transformation apparatus 5 comprises a transformation execution unit 6, backward transformation execution unit 7, temporary storage unit 8, analysis unit 9, transformation rule management unit 10, and transformation record management unit 11. The apparatus 5 plays a role of mediating structured documents between the structured document distribution apparatus 1 and structured document browse/edit apparatus 12. That is, the apparatus 5 transforms a structured document distributed from the structured document distribution apparatus 1 into a format (document structure) suitable for the browse/edit process at the structured document browse/edit apparatus 12, and transforms a structured document sent from the structured document browse/edit apparatus 12 into a format (document structure) suitable for storage in the structured document distribution apparatus 1.

The temporary storage unit 8 temporarily stores a structured document before transformation by the structured document transformation apparatus 5. Upon reversely transforming a structured document, if the contents of the structured document before transformation need be referred to, the structured document can be read out from the temporarily storage unit 8, and can be referred to.

The analysis unit 9 analyzes a structured document, and its analysis result is used in forward/backward transformation of a structured document by the transformation execution unit 6 and backward transformation execution unit 7. Note that transformation in transformation records is also called forward transformation as opposed to backward transformation.

An XML document holds a hierarchical structure in which a given element has a parent-child relationship with another element, and the hierarchical structure forms a semantic combination.

In the system shown in FIG. 1, identifiers are assigned to all elements of each XML document stored in the structured document distribution apparatus 1, and some or all of these identifiers are succeeded to an XML document after transformation, edit, and backward transformation. However, in the following description, an XML document to which no identifiers are assigned is used unless it is confusing.

For example, the following XML document that describes "nominal list" information in XML will be examined.

```
<nominal_list>
    <name>
        <last_name>A1</last_name>
        <first_name>A2</first_name>
    </name>
    <name>
        <last_name>B1</last_name>
        <first_name>B2</first_name>
    </name>
</nominal_list>
```

In the above XML document, each element "name" forms a semantic combination, i.e., a pair of elements "last name" and "first name". Hence, if transformation for deleting element "name" is made, we have:

```
<nominal_list>
    <last_name>A1</last_name>
    <first_name>A2</first_name>
    <last_name>B1</last_name>
    <first_name>B2</first_name>
</nominal_list>
```

Hence, semantic combinations corrupt, and the correspondence between the last and first names becomes unclear. On the other hand, if transformation for dividing each element "name" into two elements to set elements "last name" and "first name" as child elements of different elements is done, we have:

```
<nominal_list>
    <name>
        <last_name>A1</last_name>
    </name>
    <name>
        <first_name>A2</first_name>
    </name>
    <name>
        <last_name>B1</last_name>
    </name>
    <name>
        <first_name>B2</first_name>
    </name>
</nominal_list>
```

In this case as well, semantic combinations corrupt, and the correspondence between the last and first names becomes unclear.

Next, the following XML document, which is different from the above XML document that manages "nominal list" information will be examined.

```
<nominal_list>
    <member>
        <name>A1</name>
        <address>
            <postal_code>111-1111</postal_code>
            <city>A2</city>
        </address>
    </member>
    <member>
        <name>B1</name>
        <address>
            <postal_code>222-2222</postal_code>
            <city>B2</city>
        </address>
    </member>
</nominal_list>
```

In this XML document, if transformation for deleting element "address" is done, we have:

```
<nominal_list>
    <member>
        <name>A1</name>
        <postal_code>111-1111</postal_code>
        <city>A2</city>
    </member>
    <member>
        <name>B1</name>
        <postal_code>222-2222</postal_code>
        <city>B2</city>
    </member>
</nominal_list>
```

In this case, even after element "address" is deleted, the correspondence between elements "postal code" and "city" is clear, and semantic combinations do not corrupt in this sense. On the other hand, if transformation for dividing element "address" into two elements to set elements "postal code" and "city" as child elements of different elements is done, we have:

```
<nominal_list>
    <member>
        <name>A1</name>
        <address>
            <postal_code>111-1111</postal_code>
        </address>
        <address>
            <city>A2</city>
        </address>
    </member>
    <member>
        <name>B1</name>
        <address>
            <postal_code>222-2222</postal_code>
        </address>
        <address>
            <city>B2</city>
        </address>
    </member>
</nominal_list>
```

In this case as well, semantic combinations in the XML document after transformation are clear.

In this manner, some elements in XML documents include two types of elements. That is, some elements make semantic combinations in each XML document unclear if they are deleted or are divided into a plurality of elements, but some other elements can maintain semantic combinations in each XML document clear even when they are deleted or are divided into a plurality of elements.

When an XML document sent from the structured document distribution apparatus 1 is transformed into a format suitable for the browse/edit process at the structured document browse/edit apparatus 12, transformation must be done within a range in which semantic combinations held by the XML documents stored in the structured document distribution apparatus 1 can be avoided from corrupting.

The analysis unit 9 analyzes a structured document to detect the above two types of elements. Specifically, the analysis unit 9 classifies internal elements(excluding a root element and all leaf elements) in the structured document into the two types of elements. One is the "important" element which should not be removed in the forward transformation process, and the other is the normal element.

The analysis unit 9 also performs one of processing regarding the important element described below:

(1) Checking all transformation rules (described later) to see if there are transformation rules that remove the important element in advance. If so, the analysis unit 9 regards the rules themselves as invalid.

(2) Upon performing steps of a (forward) transformation of the structured document in accordance with the transformation rules, checking each step to make sure that the corresponding rule does not remove the important node. If it is detected by the analysis unit 9 that a step is about to remove the important node, the analysis unit 9 cancels the step.

The transformation rule management unit 10 manages transformation rules used upon transforming an XML document.

The transformation rules may include, e.g., the following rules.

(1) Change a path name in an XML document into another path name. More specifically, there are three cases wherein only a building element name is changed, only a document structure is changed, and both the document structure and building element name are changed. Note that the number of elements contained in a path can be changed upon changing the path name. If this transformation rule of changing a path name is used, for example, path name "member/name/telephone number" may be changed to another alphabetical path name "member/name/tel", a document structure may be changed by deleting element "home" from path name "nominal list/name/home/telephone number/$1" (to obtain "nominal list/name/telephone number/$1"), or the element name of element "telephone number" may be changed to "contact address" (to obtain "nominal list/name/contact address/$1"). In this manner, in a structured document to which the transformation rule of changing a path name is applied, the document structure of an area (partial document) in the structured document specified by the path (before change) designated by this transformation rule is changed (to a document structure expressed by a path after change designated by the transformation rule).

(2) Delete a path of an XML document. To delete a path is to delete a partial document designated by that path. If the last element of the path of an XML document holds descendant elements, they are deleted together. Note that the last element of the path, e.g., path "member/address", is element "address". If child elements "postal codes", "province", and the like are present below element "address", they are also deleted.

(3) Move a path of an XML document. In a structured document to which this transformation rule of moving a path is applied, an area (partial document) in the structured document specified by the path designated by this transformation rule is moved to a position designated by the transformation rule. In this case, there is a constraint that movement of the path of an XML document must not break semantic combinations held by the XML document.

If the type of transformation is defined in more detail, the rule of changing a path (name) may include the following changes:

(4) Add a new partial document.

(5) Combine a plurality of partial documents designated by different paths into one partial document that can be designated by one path.

(6) Divide one partial document designated by one path into independent partial documents designated using a plurality of different paths.

(7) Add, into a partial document, a copy of another partial document.

These changes may be defined as transformation rules of types independently of the rule of changing a path.

Note that the transformation rules are not limited to aforementioned ones, and required transformation rules may be used as needed. In this embodiment, the following explanation will be given taking transformation rules of types described in (1) to (3) above as an example.

Transformation of the document structure of an XML document in XSLT is normally based on a manipulation for creating a new "tree" from a "tree" that expresses a document structure which meets a given condition. However, transformation of the document structure of an XML document in the present invention is based on a manipulation for a partial document specified by "path". For this reason, transformation of a document structure in the present invention is simpler than that in XSLT, and backward transformation corresponding to that transformation can be easily and automatically made.

In transformation of changing a path name to transform a partial document specified by a given path name in a single structured document into a document structure with another path name, since the element names and the number of elements change, it is impossible to obtain one-to-one correspondence between elements before and after transformation. Therefore, it is impossible to allow elements after transformation to succeed all identifiers held by elements before transformation, either. Hence, an identifier of at least one building element in a partial document after change succeeds that of at least one building element in the partial document before change. For example, an identifier held by the last element of a path after transformation succeeds that of a path before transformation. With this method, it is impossible to obtain one-to-one correspondence between elements before and after transformation, but it is possible to obtain one-to-one correspondence between partial documents before and after transformation.

As will be described later, in a transformation record, an element identifier held by the last element of a path before transformation is also used to specify an area (position) in a structured document to which the transformation rule is applied.

The transformation process of a document structure by the transformation rules and succession of an element identifier will be described in detail below taking three transformation rules of changing a path name, deleting a path, and moving a path of the plurality of transformation rules described above as an example. For example, the following XML document which describes "nominal list" information in XML will be examined. In this case, an identifier of an element (element identifier) is written as attribute information of that element in the start tag of each element like "id="element identifier"".

```
<personal_information id="pi1">
    <name id="pi2">A1</name>
    <company id="pi3"><address
id="pi4">A2</address></company>
    <home id="pi5"><address
id="pi6">A3</address></home>
    <e-mail id="pi7">A4</e-mail>
</personal_information>
```

Assume that one of transformation rules managed by the transformation rule management unit 10 is "change path "company/address/$1" to path "company address/$1"". Note that "$1" indicates a variable. In this case, the document structure of a partial document made up of element "company" (more specifically, a partial document made up of element "company", and element "address" as a child element of "company") is changed. More specifically, when this transformation rule is applied to the XML document, partial document "<company id="pi3"><address id="pi4">A2</address></company>" is transformed into partial document "<company_address id="pi4">A2</company_address>".

In this case, element identifier "pi4" held by the last element (element "company address") of the path after transformation succeeds that (element "address") of the path before transformation. Hence, the following XML document is obtained.

```
<personal_information id="pi1">
    <name id="pi2">A1</name>
    <company_address id="pi4">A2</company_address>
    <home id="pi5"><address
id="pi6">A3</address></home>
    <e-mail id="pi7">A4</e-mail>
</personal_information>
```

Assume that another transformation rule managed by the transformation rule management unit 10 is "delete path "home/address/$1". In this case, a partial document made up of element "home" (more specifically, a partial document made up of element "home", and element "address" as a child element of "home") is deleted. If this transformation rule is applied to the above XML document, the following XML document is obtained.

```
<personal_information id="pi1">
    <name id="pi2">A1</name>
    <company_address id="pi4">A2</company_address>
    <e-mail id="pi7">A4</e-mail>
</personal_information>
```

Furthermore, assume that still another transformation rule managed by the transformation rule management unit 10 is "move path "e-mail/$1" to a position immediately after element "name"". In this case, a partial document made up of element "e-mail" is moved to a position immediately after a partial document made up of element "name". That is, if this transformation rule is applied to the above XML document, the following XML document is obtained.

```
<personal_information id="pi1">
    <name id="pi2">A1</name>
    <e-mail id="pi7">A4</e-mail>
    <address id="pi4">A2</address>
</personal_information>
```

The transformation rule management unit 10 registers and manages, for example, the aforementioned three different transformation rules.

When the transformation rule is applied to an XML document, a transformation record that indicates the applied transformation rule and an area (partial document) in an XML document to which the rule is applied is recorded in the transformation record management unit 11. In this case, the information that indicates "area (partial document) to which the rule is applied" indicates the element identifier of the last element in the path name which designates that partial document.

The backward transformation execution unit 7 executes backward transformation of recorded transformation using a transformation record upon transforming an XML document sent from the structured document distribution apparatus 1 into a format suitable for display on the structured document browse/edit apparatus 12, when an XML document sent from the structured document browse/edit apparatus 12 is transformed into a format suitable for storage in the structured document distribution apparatus 1.

The backward transformation execution unit 7 receives an XML document sent from the structured document browse/edit apparatus 12, and executes backward transformation of the transformation done by the transformation execution unit 6 for the received XML document. Upon executing backward transformation, the unit 7 acquires transformation records managed by the transformation record management unit 11 one by one, and applies the acquired transformation records to the XML document in turn. In this case, if the transformation rules and an XML document before transformation by the transformation execution unit 6 need be referred to, the unit 7 inquires of the transformation rule management unit 10 and temporary storage unit 8 as needed to acquire required information.

An XML document that has been transformed by the structured document transformation apparatus 5 is sent to the structured document browse/edit apparatus 12. If that XML document is edited at the structured document browse/edit apparatus 12, an XML document, which is sent from the structured document browse/edit apparatus 12 to the structured document transformation apparatus 5, is different from that sent from the structured document transformation apparatus 5 to the structured document browse/edit apparatus 12.

In such case, backward transformation to be done by the backward transformation execution unit 7 is not perfectly symmetrical to transformation done by the transformation execution unit 6. That is, a partial document (path) deleted by the edit process at the structured document browse/edit apparatus 12 does not undergo backward transformation although it has undergone transformation. On the other hand, a new partial document (path) created by the edit process at the structured document browse/edit apparatus 12 undergoes backward transformation although it has not undergone transformation.

For example, the following XML document will be examined. In this case as well, an element identifier is written as attribute information of that element in the start tag of each element like "id="element identifier"".

```
<personal_information id="pi1">
    <name id="pi2">A1</name>
    <company id="pi3"><address id="pi4">A2</address></company>
</personal_information>
```

In this case, assume that the transformation rule management unit 10 registers and manages, e.g., the following two transformation rules to transform the document structure of the XML document.

Transformation rule R101: change path "company/address/$1" to "company address/$1".

Transformation rule R102: change path "home/address/$1" to "home address/$1".

Note that "$1" indicates a variable. When these transformation rules R101 and R102 are applied to the XML document and the transformation execution unit 6 executes transformation, transformation rule R101 alone is applied, and the following XML document is obtained. <personal_information id="pi1">

<name id="pi2">A1</name>

<company_address id="pi4">A2</company_address></personal_information>

In this case, the following two transformation records are recorded in the transformation record management unit 11.

Transformation record M101: transformation rule R101 was applied to a path that holds element with element identifier "pi4" as the last element.

Transformation record M102: no path to which transformation rule R102 was to applied was present.

The transformation records are used upon reversely transforming the document structure of the XML document by the backward transformation execution unit 7.

Assume that the user has edited this XML document at the structured document browse/edit apparatus 12 to delete element "company address" and to add new element "home address", i.e., to obtain the following XML document.

```
<personal_information id="pi1">
    <name id="pi2">A1</name>
    <home address>A3</home address>
</personal_information>
```

When the transformation records M101 and M102 are applied to this XML document, and the backward transformation execution unit 7 of the structured document transformation apparatus 5 executes backward transformation, since the above XML document does not include any path "company address/A2" that holds the element with element identifier "pi4" as the last element by now, but includes path "home paddress/A3" instead, transformation record M101 cannot be applied, and transformation record M102 is applied. In this case, a manipulation opposite to that of transformation rule R102 is made for path name "home address/$1" and, consequently, this path is changed to "home/address/$1", thus obtaining the following XML document.

```
<personal_information id="pi1">
    <name id="pi2">A1</name>
    <home><address>A3</address></home>
</personal_information>
```

In this manner, the transformation record records a position (area determined by the identifier of the last element) in a structured document and a transformation rule applied. Note that transformation in transformation records is also called forward transformation as opposed to backward transformation.

Backward transformation of a document structure makes transformation opposite to that defined by a transformation rule on the basis of transformation records.

Backward transformation corresponding to the transformation rule of changing a path name restores the document structure of a partial document that has undergone forward transformation of changing a path name to a document structure before forward transformation. In this case, if element identifiers and attribute information such as a pointer attribute to be described later are assigned to that partial document, the document structure is restored as well as the setups of these identifiers and attribute information.

Backward transformation corresponding to the transformation rule of deleting a path restores a partial document deleted by forward transformation of deleting a path.

Backward transformation corresponding to the transformation rule of moving a path restores the position of a partial document that has undergone forward transformation of moving a path to a position before forward transformation.

Backward transformation corresponding to the transformation rule of changing a path name (e.g., to change path A to path B) is a manipulation for transforming a partial document designated by the identifier of the last element in a transformation record (a partial document having a document structure designated by path B) into a document structure designated by path A. If a structured document to be processed, which is to undergo backward transformation, includes a path (partial document) corresponding to (matching) path B in addition to a partial document designated by the identifier of the last element in the transformation record, that path (partial document) is also changed to a document structure designated by path A. In this case, attribute information such as a pointer attribute to be described later can be set. Furthermore, even in case of the transformation record indicating that the transformation rule of transforming a path name is not applied, if a structured document to be processed, which is to undergo backward transformation, includes a path (partial document) corresponding to (matching) path B, backward transformation of changing that path (partial document) to a document structure designated by path A is executed. In such case, attribute information such as a pointer attribute to be described later can be set.

Backward transformation corresponding to the transformation rule of deleting a path (e.g., to delete path A) is a manipulation for extracting a partial document designated by the identifier of the last element in the transformation record from a structured document before forward transformation, which is stored in the temporary storage unit 8, and adding the extracted partial document to a delete position in a structured document to be processed, which is to undergo backward transformation. In this case, if element identifiers and attribute information such as a pointer attribute to be described later are assigned to that partial document, the document structure is restored as well as setups of these identifiers and attribute information. If a structured document to be processed, which is to undergo backward transformation, includes a path (partial document) corresponding to (matching) path A in addition to a partial document designated by the identifier of the last element in the transformation record, a manipulation for setting attribute information such as a pointer attribute to be described later in that partial document can be made. Furthermore, even in case of the transformation record indicating that the transformation rule of transforming a path name is not applied, if a structured document to be processed, which is to undergo backward transformation, includes a path (partial document) corresponding to (matching) path A, a manipulation for setting attribute information such as a pointer attribute to be described later in that partial document is also available.

Backward transformation corresponding to the transformation rule of moving a path (e.g., to move path A (from position x1) to position x2) is a manipulation for detecting the position before movement of a partial document designated by the identifier of the last element in the transformation record with reference to a structured document before forward transformation, which is stored in the temporary storage unit 8, and moving that partial document to the detected position. If a structured document to be processed, which is to undergo backward transformation, includes a partial document corresponding to (matching) path A at position x2 in addition to a partial document designated by the identifier of the last element in the transformation record, that partial document is also moved to position x1. In this case, a manipulation for setting attribute information such as a pointer attribute to be described later in that partial document can be made. Furthermore, even in case of the transformation record indicating that the transformation rule of transforming a path name is not applied, if a structured document to be processed, which is to undergo backward transformation, includes a partial document corresponding to (matching) path A at position x2, that partial document is also moved to position x1. In this case, a manipulation for setting attribute information such as a pointer attribute to be described later in that partial document can be made.

An XML document that has undergone backward transformation is sent to the structured document distribution apparatus 1. In this case, either a full XML document that has undergone backward transformation or the difference between the XML document that has undergone backward transformation and an XML document stored in the temporary storage unit 8 may be sent to the structured document distribution apparatus 1.

The structured document browse/edit apparatus 12 comprises an analysis unit 13 and a browse/edit execution unit 14.

When an XML document is edited at the structured document browse/edit apparatus 12, an edit process that breaks semantic combinations held by that XML document must be avoided as in transformation of an XML document in the structured document transformation apparatus 5. Also, the edited XML document should comply with the same document structure as that of an XML document before edit.

The analysis unit 13 checks, e.g., if the document structure of an XML document edited by the browse/edit execution unit 14 complies with the same document structure as that of an XML document before edit and has undergone an edit process that breaks semantic combinations held by that XML document. Such check process can be implemented by checking using DTD (Document Type Definition) prepared in correspondence with the type of document structure of that XML document (and the type of terminal) and a verification program called a parser if the edited XML document complies with the DTD. In this manner, as an edit process of a structured document by the browse/edit execution unit 14, only an edit process within the range that matches a document structure compatible to the use mode of that structured document is permitted, and an edit process outside that range is denied.

The browse/edit execution unit 14 receives an XML document sent from the structured document transformation apparatus 5, displays a structured document to the user, accepts user's edit processes, and sends the edited XML document to the structured document transformation apparatus 5. As described above, the edited XML document must comply with an appropriate document structure. Whether or not the edited XML document complies with a given document structure is checked using the analysis unit 13.

The browse/edit execution unit 14 may accept only edit processes that do not break a document structure while simultaneously analyzing user's edit processes by the analysis unit, or may accept all edit processes, and then verify via the analysis unit 13 if these edit processes violate a given document structure. For example, the following explanation will be given taking the former case as an example, but the processing operations of the browse/edit execution unit 14 and analysis unit 13 are basically the same even in the latter case.

The processing operations made until an XML document is sent from the structured document distribution apparatus 1 to the structured document browse/edit apparatus 12 via the structured document transformation apparatus 5 will be explained below.

Upon receiving a document read request from the structured document browse/edit apparatus 12, the structured document distribution apparatus 1 reads out an XML document, which is stored in the storage unit 2 in the structured document distribution apparatus 1 and is designated by that read request, via the read unit 3, and sends the readout XML document to the structured document transformation apparatus 5.

Figure 2:
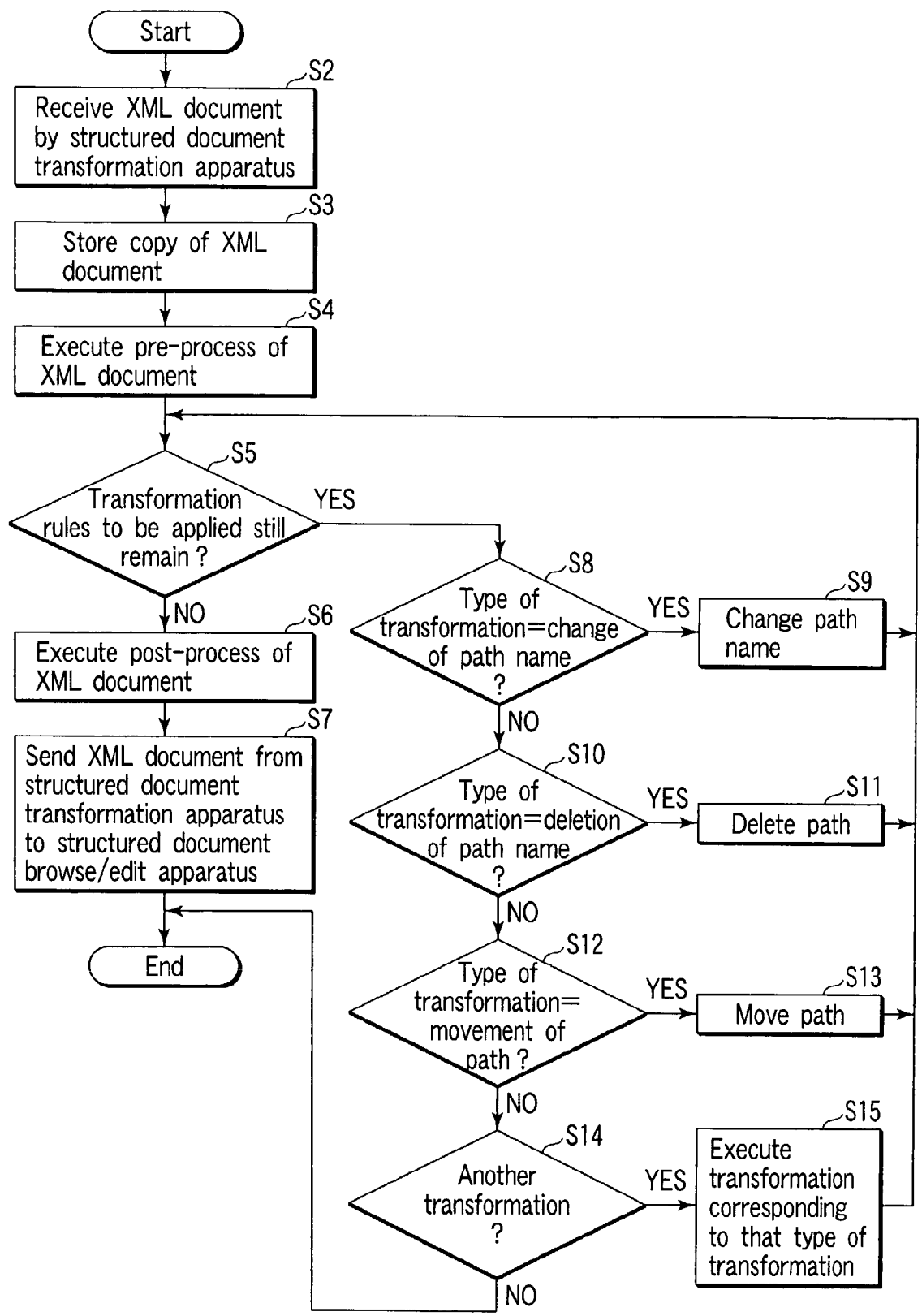
FIG. 2 is a flow chart for mainly explaining the processing operation of a transformation execution unit of a structured document transformation apparatus.

The processing operation of the transformation execution unit 6 of the structured document transformation apparatus 5 will be mainly explained below with reference to the flow chart shown in FIG. 2.

Upon receiving an XML document sent from the structured document distribution apparatus 1 (step S2), the transformation execution unit 6 stores a copy of the received XML document in the temporary storage unit 8 (step S3). The unit 6 transforms the received XML document to a format suitable for the subsequent transformation process using transformation rules. For this purpose, the unit 6 executes a pre-process for the XML document (step S4). In the pre-process, the description format of the XML document is transformed into a format suitable for transformation using transformation rules with reference to the analysis result of the XML document by the analysis unit 9 (while checking DTD that defines the document structure of that XML document).

The transformation execution unit 6 acquires transformation rules registered and managed by the transformation rule management unit 10 one by one from the top, and applies the acquired transformation rules in turn to transform the document structure of the XML document. Upon applying one transformation rule, the unit 6 records a transformation record that indicates a path and transformation rule applied to that path in the transformation record management unit 11. The unit 6 repeats this procedure for all transformation rules (step S5, steps S8 to S15).

More specifically, if the type of transformation rule picked up from the transformation rule management unit 10 pertains to a change of a path name of an XML document (step S8), the flow advances to step S9; otherwise, the flow advances to step S10.

If it is determined in step S10 that the type of transformation rule picked up from the transformation rule management unit 10 pertains to deletion of a path of an XML document, the flow advances to step S1; otherwise, the flow advances to step S12.

If it is determined in step S12 that the type of transformation rule picked up from the transformation rule management unit 10 pertains to movement of a path of an XML document, the flow advances to step S13; otherwise, i.e., if the picked-up transformation rule is one other than the change of a path name, deletion of a path name, and movement of a path (for example, creation of a new path, combination of paths, division of a path, and the like), the flow advances to step S14.

If it is determined in step S14 that the transformation rule picked up from the transformation rule management unit 10 is one other than the change of a path name, deletion of a path name, and movement of a path (for example, creation of a new path, combination of paths, division of a path, and the like mentioned above), the flow advances to step S15; otherwise, e.g., if the picked-up transformation rule does not correspond to any types of transformation rules prepared in advance, the control terminates abnormally.

In step S9, the transformation execution unit 6 changes a path name of the XML document in accordance with the transformation rule.

In step S11, the transformation execution unit 6 deletes a path of the XML document in accordance with the transformation rule. In this case, all child elements of an element designated by the path to be deleted are deleted.

In step S13, the transformation execution unit 6 moves a path of the XML document in accordance with the transformation rule.

In step S15, if transformation corresponding to the type of transformation rule other than the change of a path name, deletion of a path, and movement of a path, i.e., creation of a new path, combination of paths, division of a path, or the like mentioned above, is available, such transformation is made.

If it is determined in step S5, all applicable transformation rules have been applied to the XML document, the flow advances to step S6 to execute a post-process for the transformed XML document (step S6). In the post-process, the transformed XML document is transformed into a description format suitable for a browse/edit process at the structured document browse/edit apparatus 12 with reference to the analysis result of the XML document by the analysis unit 9 (while checking DTD that defines the document structure of that XML document). The XML document is then sent to the structured document browse/edit apparatus 12 (step S7).

Note that the transformation rules are not limited to change of a path name, deletion of a path, movement of a path, creation of a new path, combination of paths, and division of a path described above, and various other transformation rules are available. However, the present invention can be applied to every transformation rules and their combinations. In practice, some of such transformation rules can be appropriately combined and used in correspondence with the client side at which an XML document is browsed and edited.

The processing sequence from when an XML document sent from the structured document transformation apparatus 5 is received by the structured document browse/edit apparatus 12, until the XML document that has undergone the browse/edit process at the structured document browse/edit apparatus 12 is sent to from the structured document browse/edit apparatus 12 to the structured document transformation apparatus 5 will be explained below with reference to FIGS. 3 and 4.

Figure 3:
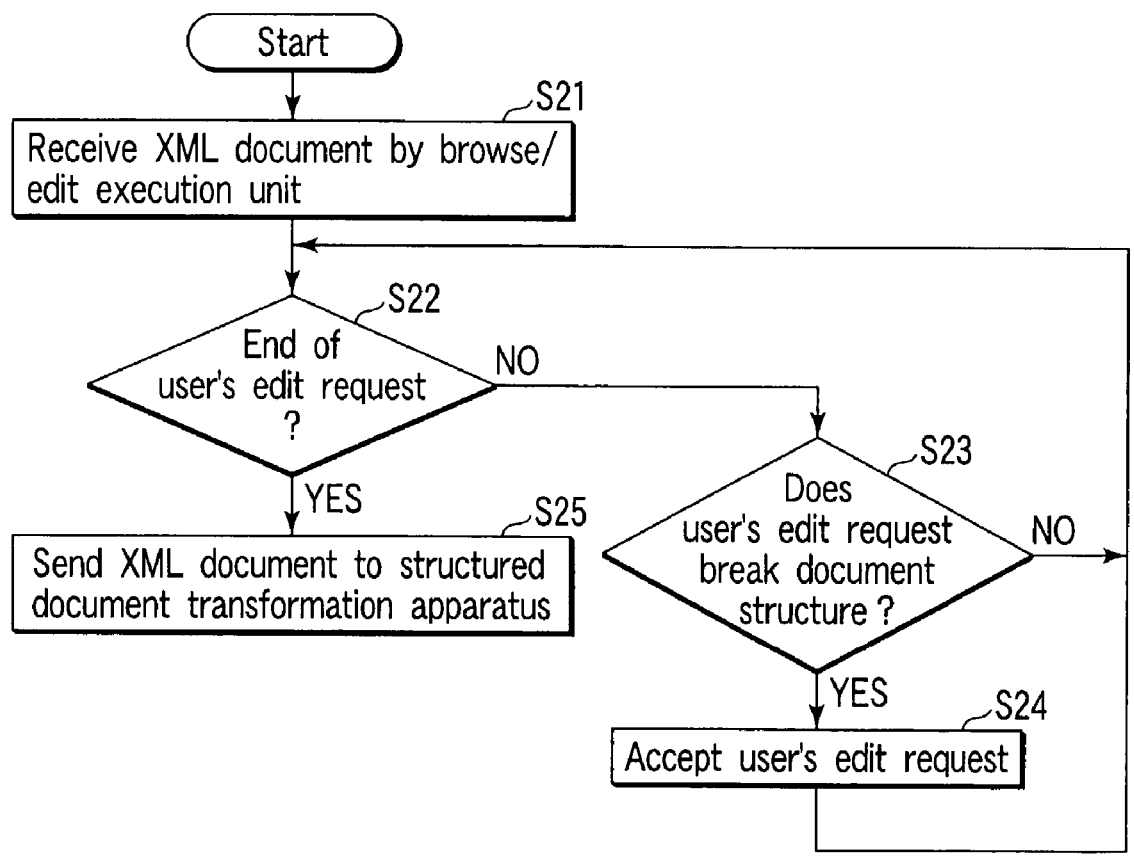
FIG. 3 is a flow chart for explaining the processing operation of a structured document browse/edit apparatus.

FIG. 3 is a flow chart for explaining the processing operation of the structured document browse/edit apparatus 12.

An XML document sent from the structured document transformation apparatus 5 is received by the browse/edit execution unit 14, and undergoes a predetermined display process, thus displaying the document on a display device such as a display or the like (step S21).

The processes in steps S23 and S24 are repeated until the edit request from the user is complete.

The browse/edit execution unit 14 checks using information obtained from the analysis unit 13 if the contents of user's edit processes break the document structure of the XML document (i.e., if the edit contents comply with DTD compatible to the document structure of that XML document). If the edit contents break the document structure, such edit processes are denied; otherwise, the flow advances to step S24 to accept the edit contents.

In step S24, the browse/edit execution unit 14 updates the XML document in accordance with a user's edit request, and the flow returns to step S22. The processes in steps S23 and S24 are repeated until the edit request is complete.

Upon completion of the user's edit request, the XML document as the edit result is sent from the browse/edit execution unit 14 to the structured document transformation apparatus 5 (step S25).

Figure 4:
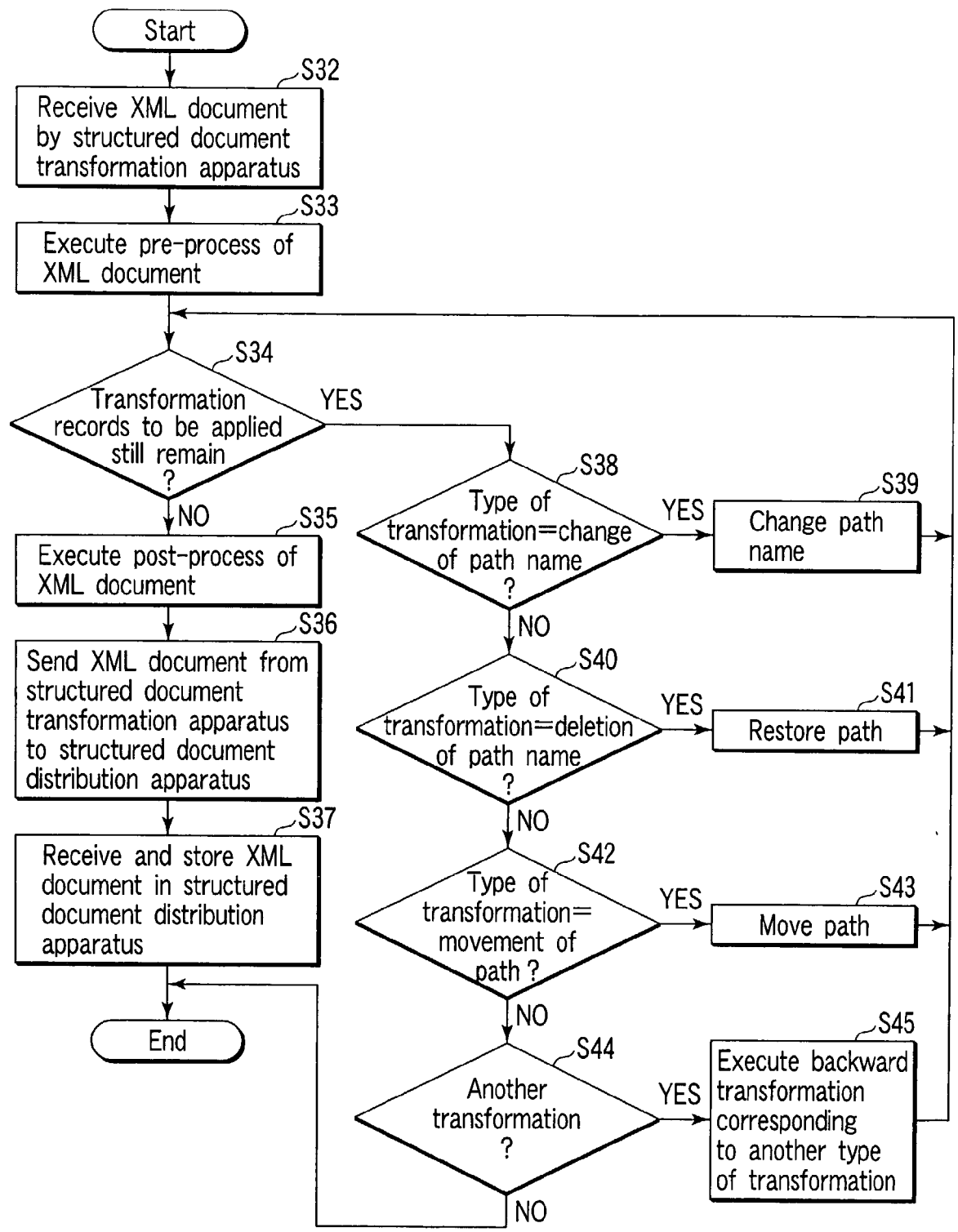
FIG. 4 is a flow chart for mainly explaining the processing operation of a backward transformation execution unit of the structured document transformation apparatus.

FIG. 4 is a flow chart for mainly explaining the processing operation of the backward transformation execution unit 7 of the structured document transformation apparatus 5.

When the edited XML document is sent from the structured document browse/edit apparatus 12 to the structured document transformation apparatus 5, the backward transformation execution unit 7 receives that document (step S32). The analysis unit 9 analyzes the XML document, and the backward transformation execution unit 7 executes a pre-process of that XML document (step S33). In the pre-process, the description format of the XML document is transformed into a format suitable for backward transformation using the transformation records with reference to the analysis result of the XML document by the analysis unit 9 (while checking DTD that defines the document structure of that XML document).

If transformation records to be applied to the XML document of those managed by the transformation record management unit 11 still remain, such transformation records are picked up one by one from, e.g., the bottom, and the picked-up transformation records are applied in turn to reversely transform the document structure of the XML document. This procedure is repeated for all the transformation records (step S34, steps S38 to S45).

More specifically, if it is determined in step S38 that the type of transformation recorded in the transformation record picked up from the transformation record management unit 11 pertains to change of a path name, the flow advances to step S39; otherwise, the flow advances to step S40.

If it is determined in step S40 that the type of transformation recorded in the transformation record picked up from the transformation record management unit 11 pertains to deletion of a path, the flow advances to step S41; otherwise, the flow advances to step S42.

If it is determined in step S42 that the type of transformation recorded in the transformation record picked up from the transformation record management unit 11 pertains to movement of a path, the flow advances to step S43; otherwise, i.e., if transformation other than change of a path name, deletion of a path, and movement of a path (e.g., creation of a new path, combination of paths, division of a path, and the like described above) is available, the flow advances to step S44.

If it is determined in step S44 that the type of transformation recorded in the transformation record picked up from the transformation record management unit 11 indicates a transformation rule other than change of a path name, deletion of a path, and movement of a path (e.g., creation of a new path, combination of paths, division of a path, or the like), the flow advances to step S45; otherwise, e.g., if the type of transformation does not correspond to any types of transformation prepared in advance, the control terminates abnormally.

In step S39, the backward transformation execution unit 7 changes a path name of the XML document in accordance with the transformation record.

In step S41, the backward transformation execution unit 7 restores the deleted path and all child elements in an area designated by the deleted path to a state before deletion, in accordance with the transformation record.

In step S43, the backward transformation execution unit 7 moves the moved path to the original position in accordance with the transformation record.

In step S45, if backward transformation corresponding to transformation other than change of a path name, deletion of a path, and movement of a path (e.g., creation of a new path, combination of paths, division of a path, and the like described above) is available, such backward transformation is executed.

If it is determined in step S34 that all transformation records are applied to the XML document, the flow advances to step S35 to execute a post-process for the XML document transformed reversely(step S36). In the post-process, the XML document transformed backward is transformed to a description format suitable for storage in the storage unit 2 of the structured document distribution apparatus 1 (while checking DTD that defines the document structure of that XML document) (step S37).

The XML document sent from the structured document transformation apparatus 5 to the structured document distribution apparatus 1 is received by the write unit 4, and is stored in the storage unit 2.

The transformation and backward transformation processes of the document structure of an XML document in the structured document transformation apparatus 5 will be described in detail below.

Upon transforming an XML document stored in the structured document distribution apparatus 1 into an XML document suitable for the browse/edit process at the structured document browse/edit apparatus 12, a pre-process for dividing an element that holds a plurality of child elements into elements equal to the number of child elements is executed prior to transformation. Such process is done to eliminate ambiguity concerning transformation upon executing transformation for changing a path name of a path that contains an element which holds a plurality of child elements.

For example, the following XML document (Doc1) will be exemplified.

```
(Doc1)
<personal_information>
    <name>
        <last_name>A1</last_name>
        <first_name>A2</first_name>
    </name>
</personal_information>
```

A case will be examined below wherein the following transformation rule is applied to the above XML document.

Transformation rule: transform path "name/last name/$1" into path "last name/$1". If this transformation rule is applied to the above XML document, element "name" holds a plurality of child elements, i.e., elements "last name" and "first name", but since path "last name/$1" obtained as a result of applying the transformation rule to path "name/last name/A1" does not contain any element "name", ambiguity remains over element "first name" after transformation.

As for element "first name" after transformation, the following two examples are possible.

```
<personal_information>
    <last_name>A1</last_name>
</personal_information>
```

The above XML document is obtained if element "first name" is to be deleted since path "last name/$1" obtained as a result of applying the transformation rule to path "name/last name/A1" does not contain any element "name" and element "first name" has lost a parent element.

```
<personal_information>
    <last_name>A1</last_name>
    <name>
        <first_name>A2</first_name>
    </name>
</personal_information>
```

The above XML document is obtained if the transformation rule "transform path "name/last name/$1" into path "last name/$1"" is interpreted to be a transformation rule "delete element "last name" from child element of element "name", and add element "last name" that holds the same element value "A2" as a child element of element "personal information"".

In order to eliminate the above ambiguity, an additional rule must be given to the structured document transformation apparatus, resulting in complicated system management and transformation processes.

However, when the above transformation rule is applied to the following XML document (Doc2) as a result of executing a pre-process for dividing an element that holds a plurality of child elements into elements equal to the number of its child elements, transformation of changing a path name does not leave any ambiguity.

```
(Doc2)
<personal_information>
    <name>
        <last_name>A1</last_name>
    </name>
    <name>
        <first_name>A2</first_name>
    </name>
</personal_information>
```

As described above, the pre-process is done for the purpose of eliminating ambiguity concerning transformation, but does not change the document structure itself, and changes only the description format of the document structure to allow easy processes upon transformation (forward or backward transformation) of the document structure. Hence, such process is not the gist of the present invention. Therefore, in the following description of the embodiment of the present invention, only a brief explanation of the pre- and post-processes will be given.

Note that the post-process executed upon transforming an XML document that has undergone a browse/edit process at the structured document browse/edit apparatus 12 into an XML document suitable for storage in the structured document distribution apparatus 1 is a process opposite to the pre-process, i.e., is a process for transforming an XML document (Doc2) into the format of an XML document (Doc1).

Assume that an XML document of "address book" information shown in FIG. 7 is read out from the storage unit 2 of the structured document distribution apparatus 1, and is sent to the structured document transformation apparatus 5.

The XML document shown in FIG. 7 has a document structure in which element "address book" has a plurality of child elements "member", each element "member" is made up of child elements "name", "home", and "company", element "name" is made up of "last name" and "first name", element "company" is made up of child elements "telephone number" and "address", element "home" is made up of child elements "telephone number" and "address", and element "address" is made up of child elements "postal code", "province", "city", and "block number". The "address book" information shown in FIG. 7 includes member information for two persons now.

Figure 10:
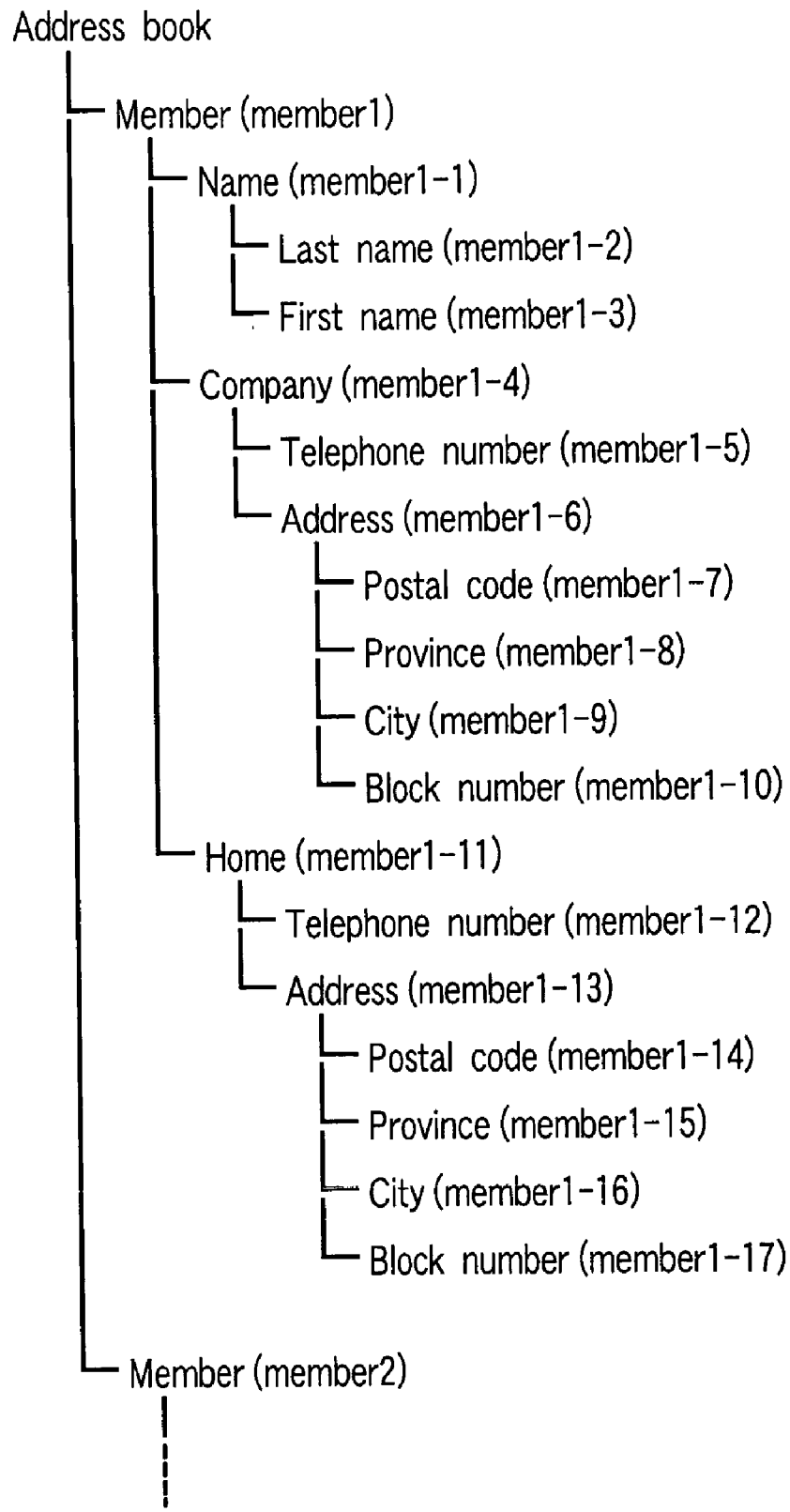
FIG. 10 shows the document structure of the XML document shown in FIG. 7.

FIG. 10 illustrates the document structure (tree structure) of the "address book" information shown in FIG. 7, and mainly shows building elements which form a document structure of member information for one person. The description in ( ) of each element name is an element identifier.

The XML document received by the structured document transformation apparatus 5 undergoes a pre-process for rewriting the description format to that suitable for transformation using transformation rules prior to transformation using transformation rules. Upon executing the pre-process, semantic combinations that the source XML document holds must be prevented from corrupting. FIG. 8 shows an XML document obtained as a result of the pre-process.

Since the XML document shown in FIG. 7 includes a plurality of pieces of "member" information, the document structure which form each "member" information is rewritten to a description format in which tags are repeated to, e.g., clarify the parent-child relationship among building elements. But the document structure itself is the same as that in FIG. 7, i.e., FIG. 10.

Figure 11:
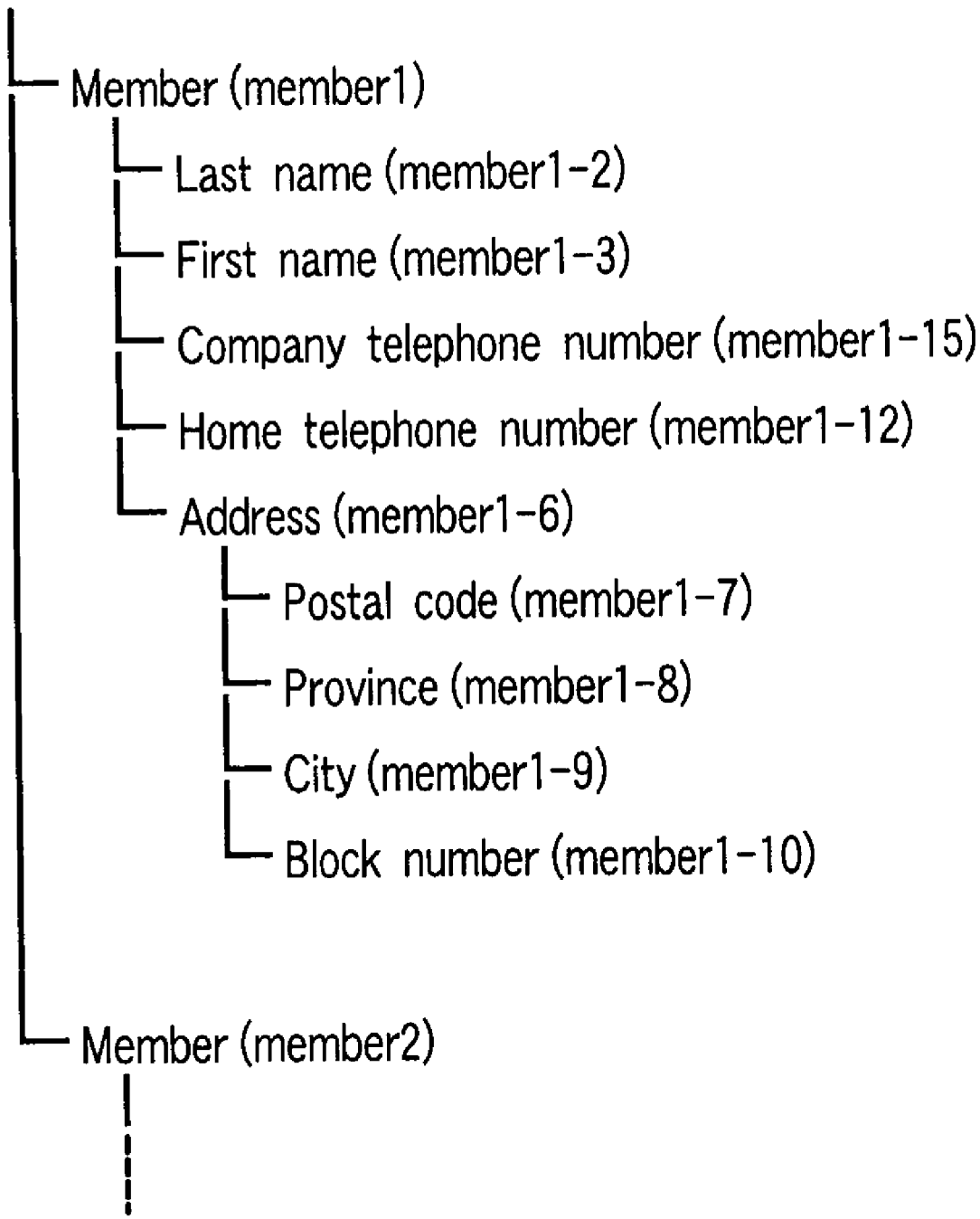
FIG. 11 shows the document structure of the XML document shown in FIG. 9.

Transformation rules are applied to the pre-processed XML document to obtain an XML document, the document structure of which has been transformed. Assume that seven transformation rules are available, as shown in, e.g., FIG. 5. Note that "$+numerical value" indicates a variable. FIG. 6 shows transformation records obtained as a result of applying the transformation rules shown in FIG. 5 to the XML document. FIG. 9 shows an XML document as a result of transformation. FIG. 11 illustrates the document structure of the XML document shown in FIG. 9.

Forward transformation in this case will be briefly explained below with reference to FIGS. 10 and 11. That is, by applying transformation rules R1 to R5 shown in FIG. 5 in the order named, "last name", "first name", "company telephone number", "address", and "home telephone number" are arranged in the order that they appear, as shown in FIG. 11. By applying transformation rule R6, a partial document including "home telephone number" is moved to a position immediately after a partial document including "company telephone number". Finally, by applying transformation rule R7, a partial document designated by path name "home/address" is deleted, thus obtaining the document structure shown in FIG. 11 as a result of transformation.

The XML document, the document structure of which has been transformed, undergoes a post-process for rewriting its document format into that suitable for the browse/edit process at the structured document browse/edit apparatus 12, thus obtaining an XML document shown in FIG. 12.

The post-processed XML document is browsed/edited by the user on the structured document browse/edit apparatus 12 to obtain a new XML document as a result of the edit process. Assume that an edit process for changing the value of element "address" as a child element of element "member" with element identifier "member1", and an edit process for adding new "member" information (information made up of elements "last name", "first name", "company telephone number", "home telephone number", and "address") for two persons have been done. FIG. 13 shows an XML document as a result of such edit processes.

The XML document that has been edited by the structured document browse/edit apparatus 12 is sent to the structured document transformation apparatus 5. The structured document transformation apparatus 5 executes a pre-process for rewriting the description format of that XML document into that suitable for transformation using transformation records prior to backward transformation using transformation record. This pre-process is the same as that upon executing the forward transformation.

Figure 14:
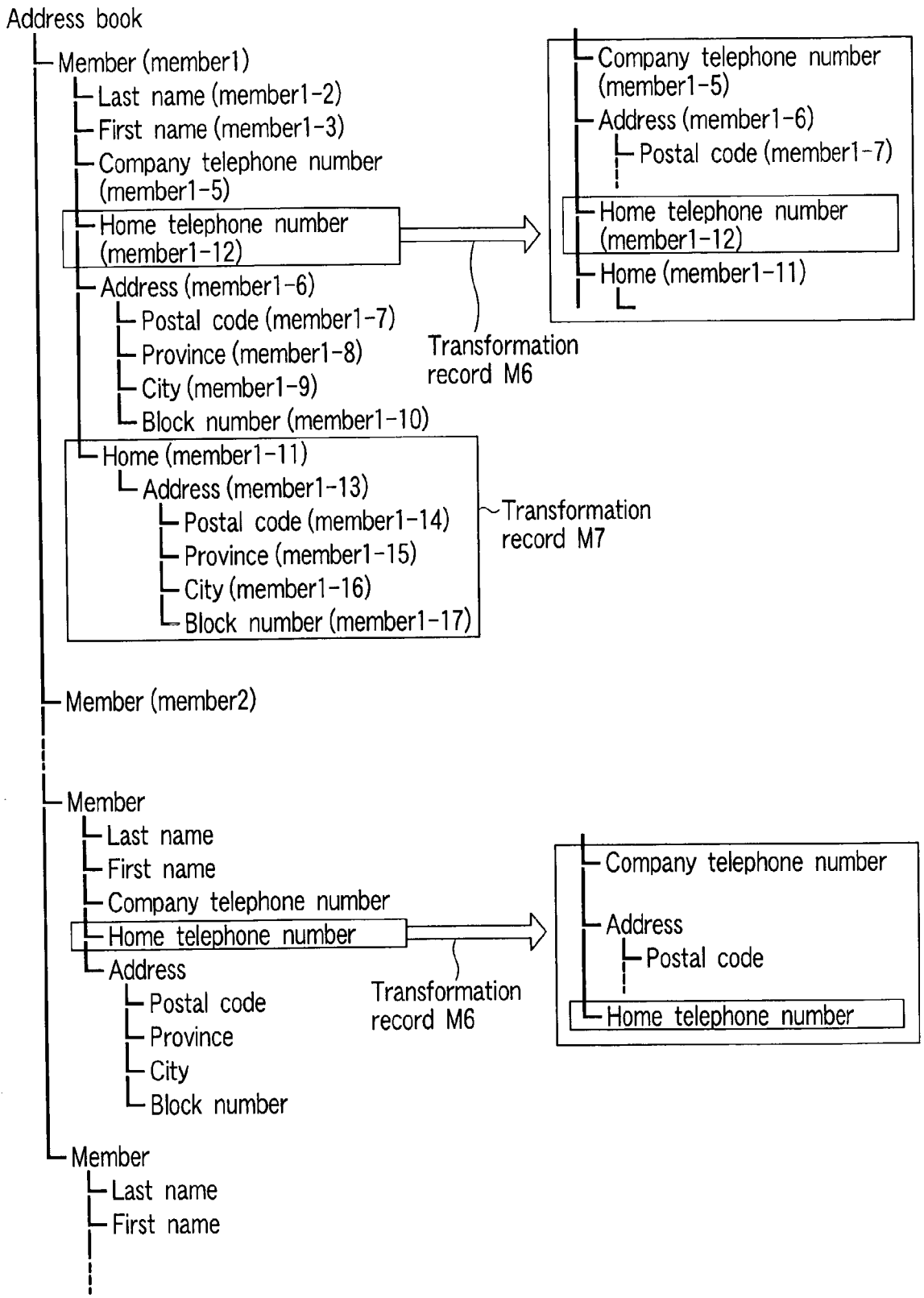
FIG. 14 is a view for explaining the process of changes in XML document by making backward transformation by applying the transformation records shown in FIG. 6 one by one.
Figure 15:
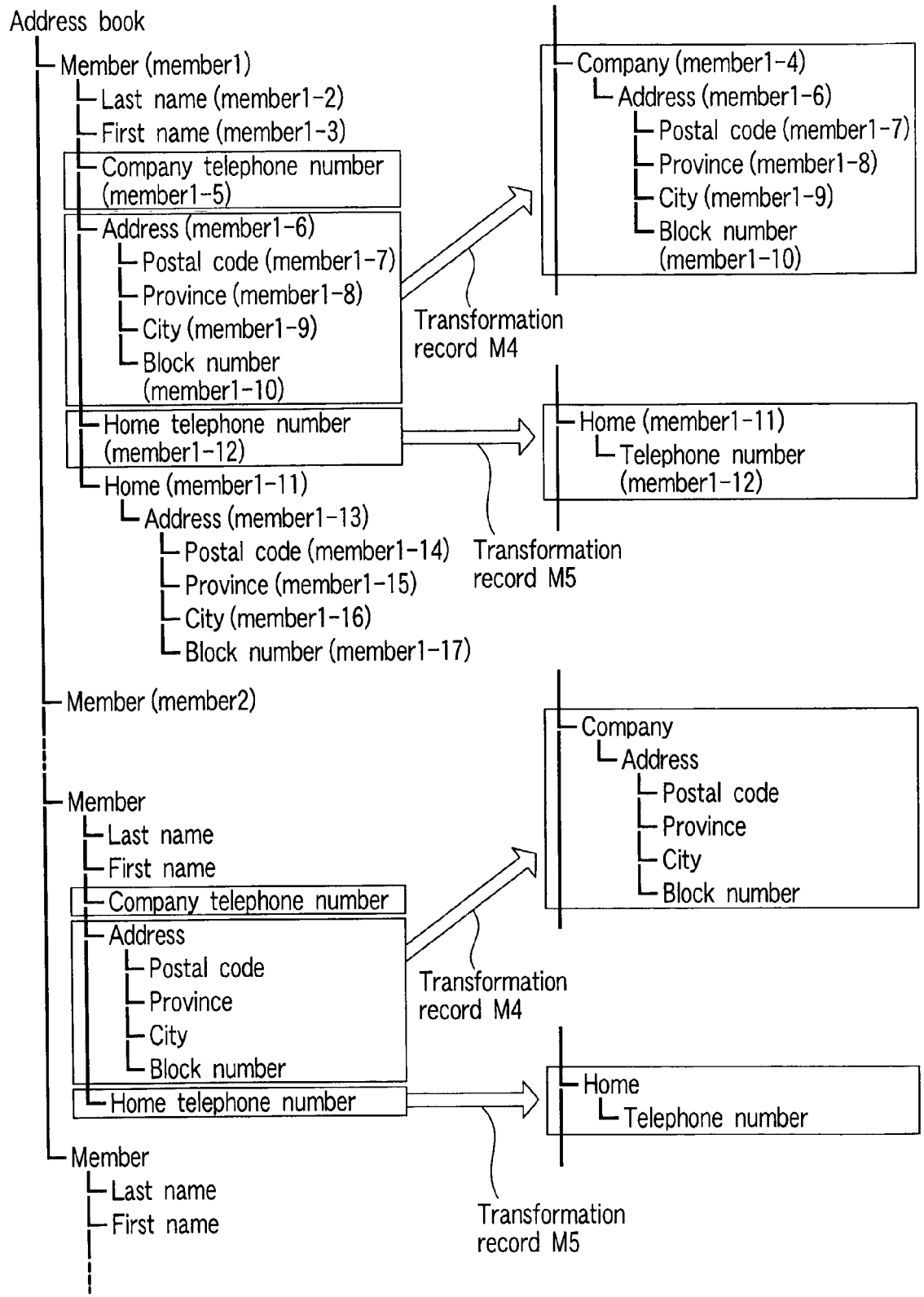
FIG. 15 is a view for explaining the process of changes in XML document by making backward transformation by applying the transformation records shown in FIG. 6 one by one.
Figure 16:
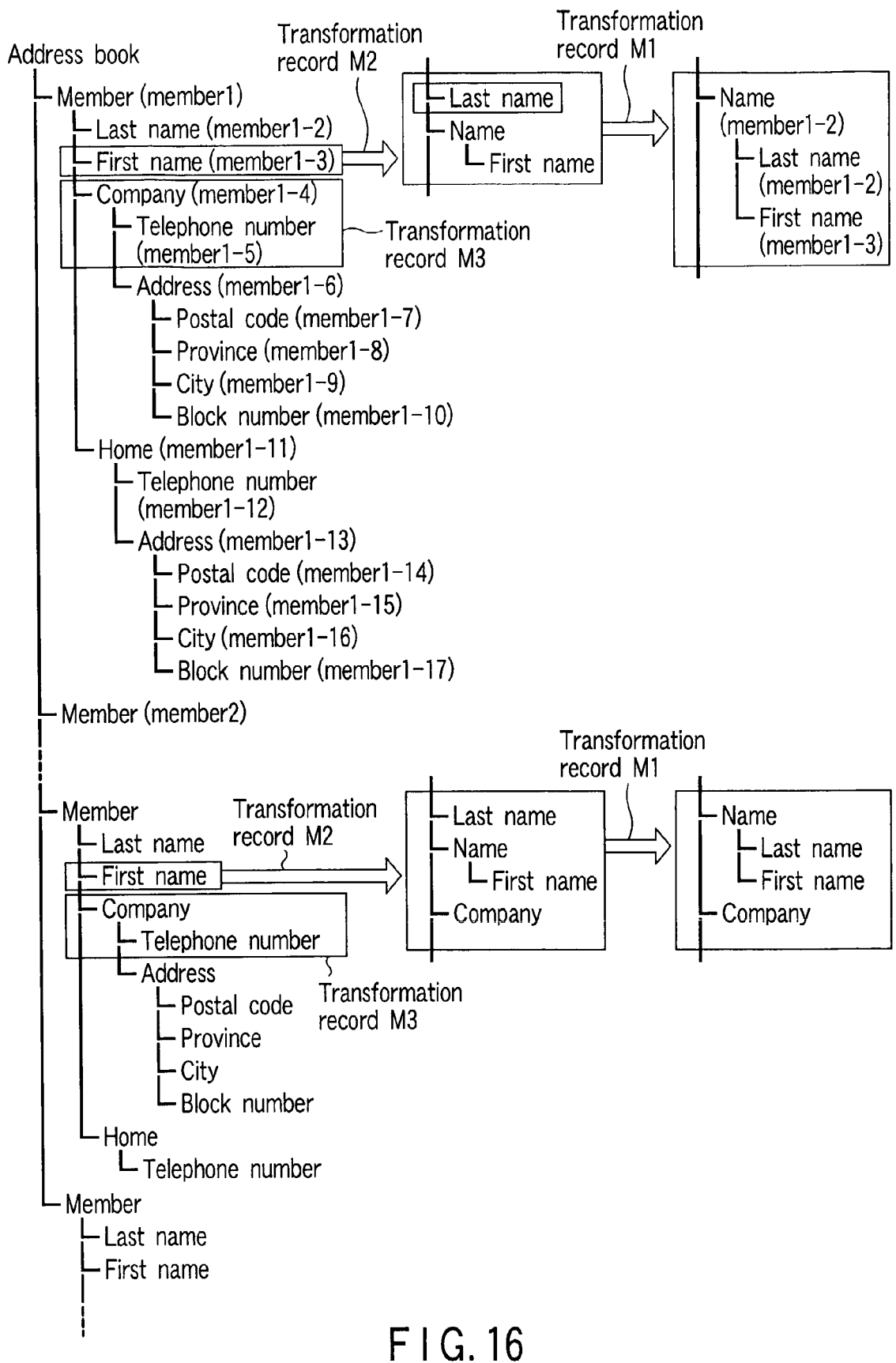
FIG. 16 is a view for explaining the process of changes in XML document by making backward transformation by applying the transformation records shown in FIG. 6 one by one.

Upon completion of the pre-process of the XML document, the transformation records managed by the transformation record management unit 11 are checked one by one from the bottom to execute backward transformation corresponding to transformation recorded in each transformation record. The process of changes in XML document via backward transformation by applying the transformation records shown in FIG. 6 one by one will be explained below with reference to FIGS. 14 to 16. Note that FIGS. 14 to 16 show only a manipulation for information of element identifier "member1", and "member" information for one person added by the edit process. In practice, information of element identifier "member2" is similarly manipulated as in information of element identifier "member1", and the same applies to another "member" information.

(1) Backward transformation corresponding to transformation record M7 is executed. More specifically, partial documents designated by paths which respectively hold elements having element identifiers "member1-13" and "member2-13" as last elements are inserted (see FIG. 14). Each partial document to be inserted is made up of element "home" which has element "address" including "postal code", "province", "city", and "block number".

(2) Backward transformation corresponding to transformation record M6 is executed. In this case, in addition to partial documents which respectively hold elements having element identifier "member1-12" and "member2-12" as last elements, two sets of "member" information for two persons added by the edit process undergo backward transformation. More specifically, as shown in FIG. 14, a partial document including "home telephone number" as a child element of element "member" in each "member" information is moved to a position next to a partial document including "address" as a child element of element "member".

(3) Backward transformation corresponding to transformation record M5 is executed. In this case, in addition to partial documents which respectively hold elements having element identifier "member1-12" and "member2-12" as last elements, two sets of "member" information for two persons added by the edit process undergo backward transformation. More specifically, as shown in FIG. 15, a partial document including "home telephone number" as a child element of element "member" in each "member" information is changed to a partial document including "home" and "telephone number" as a child element of "home".

(4) Backward transformation corresponding to transformation record M4 is executed. In this case, in addition to partial documents which respectively hold elements having element identifier "member1-6" and "member2-6" as last elements, two sets of "member" information for two persons added by the edit process undergo backward transformation. More specifically, as shown in FIG. 15, a partial document including "address" as a child element of "member" in each "member" information is changed to a partial document including "company" and "address" as a child element of company.

(5) Backward transformation corresponding to transformation record M3 is executed. In this case, in addition to partial documents which respectively hold elements having element identifier "member1-5" and "member2-5" as last elements, two sets of "member" information for two persons added by the edit process undergo backward transformation. More specifically, as shown in FIG. 16, a partial document including "company telephone number" as a child element of "member" in each "member" information is changed to a partial document including "company" and "telephone number" as a child element of "company".

(6) Backward transformation corresponding to transformation record M2 is executed. In this case, in addition to partial documents which respectively hold elements having element identifier "member1-3" and "member2-3" as last elements, two sets of "member" information for two persons added by the edit process undergo backward transformation. More specifically, as shown in FIG. 16, a partial document including "first name" as a child element of "member" in each "member" information is changed to a partial document including "name" and "first name" as a child element of "name".

(7) Backward transformation corresponding to transformation record M1 is executed. In this case, in addition to partial documents which respectively hold elements having element identifier "member1-2" and "member2-2" as last elements, two sets of "member" information for two persons added by the edit process undergo backward transformation. More specifically, as shown in FIG. 16, a partial document including "last name" as a child element of "member" in each "member" information is changed to a partial document including "name" and "last name" as a child element of "name".

Since backward transformation of the document structure of the XML document using the transformation records is complete, the XML document then undergoes a post-process for rewriting its description format to that suitable for storage in the structured document distribution apparatus 1. In this post-process, for example, a process for combining repeated tags is done.

The post-processed XML document is sent to the structured document distribution apparatus 1 to reflect the contents of the edit processes done at the structured document browse/edit apparatus 12 to the XML document stored in the structured document distribution apparatus 1. In this case, in this embodiment, in place of sending a full XML document from the structured document transformation apparatus 5 to the structured document distribution apparatus 1, only a difference from an XML document read out for the purpose of the edit processes is sent as difference information in a format shown in FIG. 17.

The difference information shown in FIG. 17 is formed of a partial document including "address" as a child element of "company" as a child element of "member" with element identifier "member1", which has been rewritten by the edit process, and partial documents corresponding to added "member" information for two persons. In this manner, the difference document contains the rewritten partial document and added partial documents in one document.

Upon receiving the difference information shown in FIG. 17, the structured document distribution apparatus 1 reflects the received contents to the XML document stored in the structured document distribution apparatus 1. In this case, new elements created by the user's edit process in the difference information are not assigned any identifiers. Hence, the structured document distribution apparatus 1 assigns unique identifiers in that XML document to elements without any identifiers, and then reflects the received contents in the XML document.

SECOND EMBODIMENT

The first embodiment has explained a case wherein one structured document is browsed/edited by one structured document browse/edit apparatus 12 so as to mainly explain principal part of the present invention. However, the structured document management system of the present invention is used in a use mode in which a plurality of structured document browse/edit apparatuses 12 respectively browse/edit different structured documents. Hence, the second embodiment will explain a structured document management system used in a more practical use mode so as to complement the above description of the first embodiment.

As the second embodiment, the following three points will be additionally explained.

(1) The transformation rule management unit 10 stores and manages transformation rule sets each including one or a plurality of transformation rules in correspondence with document structures and (types of) structured document browse/edit apparatuses 1, i.e., in correspondence with the use modes of structured documents. The use mode of one structured document differs depending on the types of terminals, e.g., whether a client is a portable phone or PDA. In general, data used by all types of terminals rarely conform with an identical data format, and all data used at all types of terminals are rarely identical. Furthermore, a portable phone uses only name and telephone number data of address book information, while a PDA uses address and e-mail address data in addition to the name and telephone number data. Hence, a case will be explained below wherein transformation rules of structured documents, each of which describes a (use mode of) document structure to be obtained as a result of transformation of that of a given structured document, are stored and managed in correspondence with the types of structured document browse/edit apparatuses 12 on which the structured document is to be actually used (browsed, edited, or the like) in the system arrangement of this embodiment.

(2) A transformation rule group that combines a plurality of transformation rules which are more likely to generate completely the same paths (partial document structures) is defined. If a given transformation rule set includes this transformation rule group, the transformation rule management unit 10 stores the transformation rule set and transformation rule group in correspondence with each other. Note that each transformation rule group is set with a priority order of transformation rules which are used in backward transformation.

(3) Component identifiers and pointer attributes are assigned as attributes of building elements of an XML document.

Figure 18:
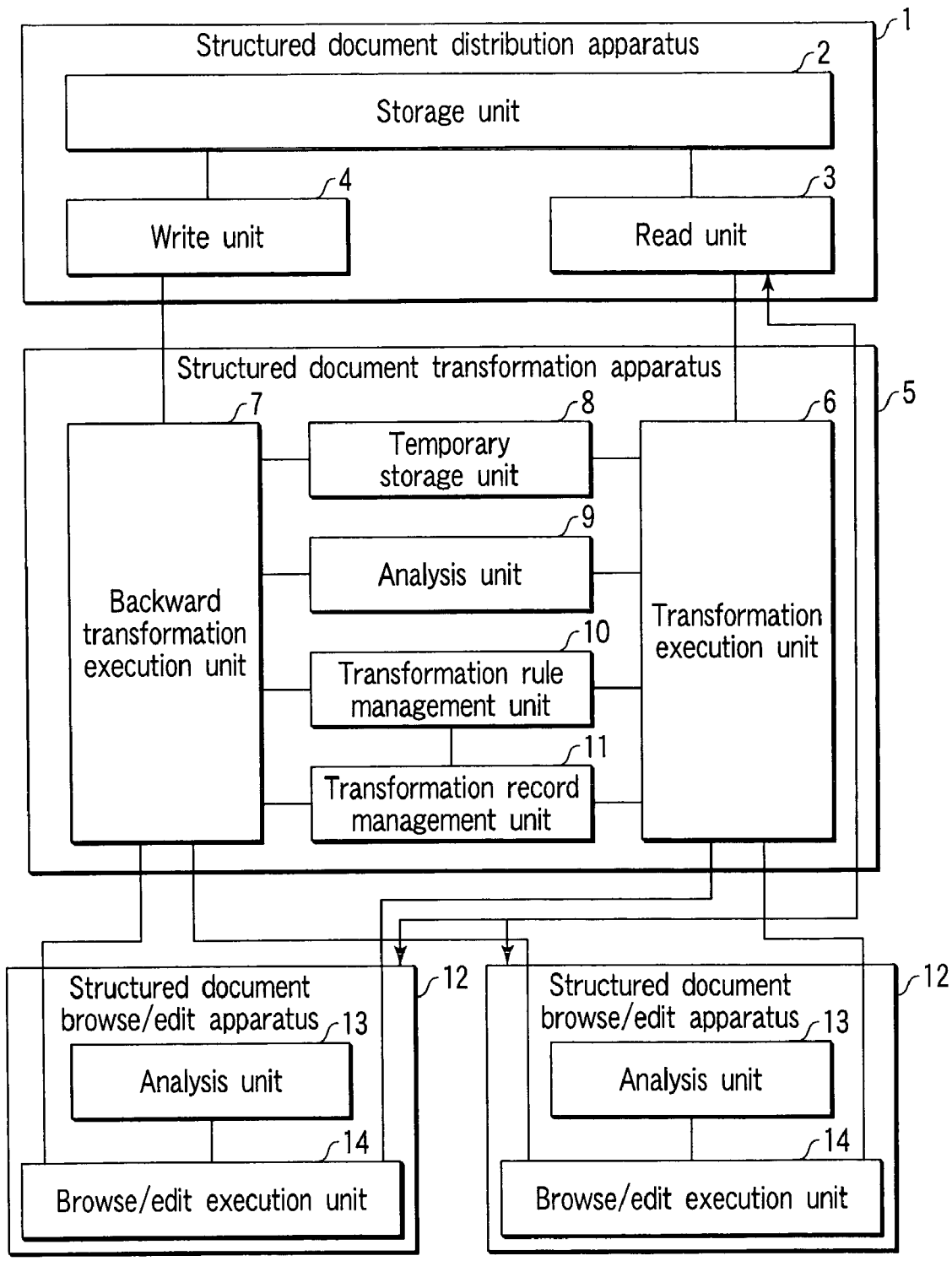
FIG. 18 is a block diagram showing an example of the arrangement of a structured document management apparatus according to the second embodiment of the present invention.

FIG. 18 shows an example of the arrangement of a structured document management system according to the second embodiment of the present invention. Note that the same reference numerals in FIG. 18 denote the same parts as in FIG. 1, and only different portions will be explained. More specifically, the storage unit 2 of the structured document distribution apparatus 1 stores a plurality of structured documents with different document structures, and a plurality of structured document browse/edit apparatuses 12 can access the structured documents stored in the storage unit 2.

Figures 19, 20:
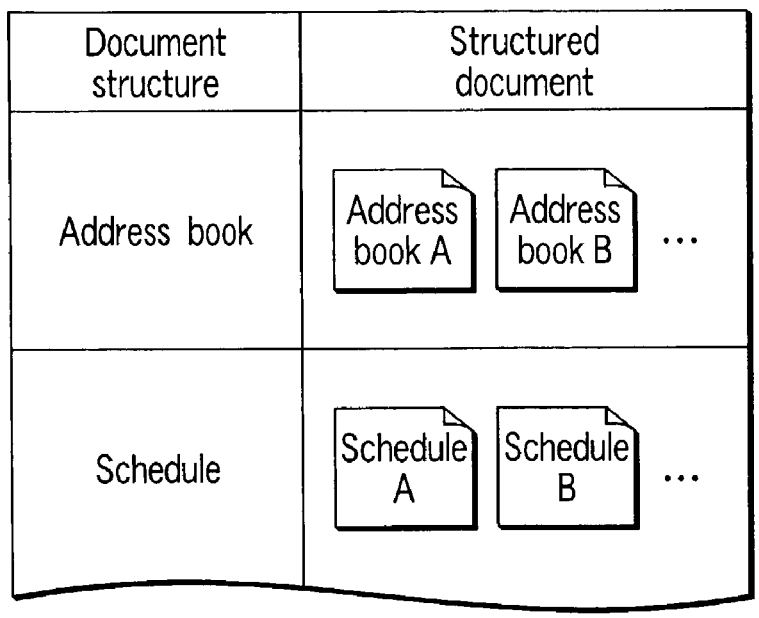
FIG. 19 illustrates a storage example of structured documents in a storage unit 2.
FIG. 20 shows a storage example of a transformation rule set.

FIG. 19 illustrates a storage example of structured documents in the storage unit 2. Data files of a plurality of structured documents are stored in the storage unit 2 while being categorized to their document structures. For example, as shown in FIG. 19, different types of identification information (e.g., "address book", "schedule", and the like) of different document structures, and data files of corresponding structured documents (e.g., data files having file names "address book A", "address book B", "schedule A", "schedule B", and the like) are stored in correspondence with each other.

One or a plurality of transformation rules used to transform a document structure of an arbitrary structured document are called a transformation rule set. For example, seven transformation rules shown in FIG. 5 are called one transformation rule set.

Upon transforming the document structure of a structured document by the structured document transformation apparatus 5, a different transformation rule set is applied depending on which one of a plurality of XML documents stored in the structured document distribution apparatus 1 is the structured document to be transformed (document structure of a structured document) or the type (e.g., a portable phone, PDA, personal computer, or the like) of structured document browse/edit apparatus 12 used to browse/edit a structured document. Hence, the transformation rule management unit 10 pre-stores and manages transformation rule sets in correspondence with document structures and structured document browse/edit apparatuses 12 used to browse/edit structured documents, as shown in, e.g., FIG. 20.

For example, in FIG. 20, each transformation rule set (in FIG. 20, a transformation rule set is described as R(identification information of a document structure, identification information of the type of structured document browse/edit apparatus) for the sake of simplicity) is stored in correspondence with the identification information of a document structure and that of (the type of) the structured document browse/edit apparatus 12.

The transformation rule management unit 10 stores and manages a table shown in, e.g., FIG. 20, and selects an appropriate transformation rule set depending on the document structure of an XML document to be transformed, and the type of structured document browse/edit apparatus 12 used to browse/edit the transformed XML document upon transforming the document structure of a structured document.

When a document read request is issued from a given structured document browse/edit apparatus 12 to the structured document distribution apparatus 1, that request preferably contains, in addition to the file name of a structured document to be read out, identification information of the document structure of that document, and identification information indicating the type of structured document browse/edit apparatus 12 as a request source.

The transformation rule group will be described below.

For example, in order to browse/edit an XML document with a document structure having identification information "address book" at a structured document browse/edit apparatus 12 with identification information "TE1", assume that a transformation rule set used to transform the document structure of that XML document is R(address book, TE1) from FIG. 20. Of this transformation rule set, two transformation rules of changing a given path name in an XML document into another path name may generate completely the same path names.

For example, assume that these two transformation rules are as follows:

Transformation rule R201: change path "company/address/$1" to "address/$1".

Transformation rule R202: change path "home/address/$1" to "address/$1".

Also, assume that the following XML document is stored in the structured document distribution apparatus 1.

```
<personal_information>
    <name>A1</name>
    <company><address>A2</address></company>
    <home><address>A2</address></home>
</personal_information>
```

An XML document obtained as a result of applying transformation rules R201 and R202 to the above XML document is as follows:

```
<personal_information>
    <name>A1</name>
    <address>A2</address>
    <address>A2</address>
</personal_information>
```

As can be seen from the above example, the two transformation rules generate completely the same paths in some cases.

Conversely, a case will be examined below wherein the following new XML document is created at a given structured document browse/edit apparatus 12.

```
<personal_information>
    <name>A1</name>
    <address>A2</address>
</personal_information>
```

Upon reversely transforming this XML document using transformation rules R201 and R202 (strictly speaking, transformation records used upon transforming the document structure by applying the above transformation rules), path "address/A2" can undergo backward transformations corresponding to both transformation rules R201 and R202. Hence, backward transformation cannot be proceeded unless either of the two different transformation rules to be applied is determined. Hence, a transformation rule group that combines a plurality of transformation rules which may generate completely the same paths is defined, and one of the transformation rules which is to be preferentially used of those which belong to that transformation rule group is determined.

For example, assume that the above two different transformation rules are combined into one transformation rule group, its identification information is defined to be, e.g., "transformation rule group G1", and it is determined that transformation rule R201 of the two transformation rules is preferentially used upon backward transformation. Also, assume that this "transformation rule group G1" is present in transformation rule set R(address book, TE1). In this case, the transformation rule management unit 10 pre-stores a table shown in, e.g., FIG. 21.

As shown in FIG. 21, when an arbitrary transformation rule set includes a plurality of transformation rules which may generate completely the same paths, such rules are combined into a transformation rule group, and priority is set in advance to one of the transformation rules which is to be preferentially used of those in that transformation rule group upon managing transformation rules. Hence, even when a plurality of transformation rules can be applied upon reversely transforming an XML document, a transformation rule to be applied can be automatically determined. The backward transformation result of the above XML document is as follows:

```
<personal_information>
    <name>A1</name>
    <company><address>A2</address></company>
</personal_information>
```

Attributes of each element of an XML document will be explained below. That is, element attributes include an identifier attribute and pointer attribute.

Since the identifier attribute has already been explained in the first embodiment, the pointer attribute will be explained in this embodiment. The pointer attribute is used to point to a specific one of a plurality of elements.

For example, when a pointer attribute is assigned to a given element, "display="true"" or "display="false"" is written as attribute information in the start tag of that element. The structured document transformation apparatus 5 uses this attribute to control to leave a partial document that contains an element with a pointer attribute value "true (T)" and to delete a partial document that contains an element with a pointer attribute value "false (F)" for a structured document browse/edit apparatus 12 which requires transformation of a document structure that deletes some partial document elements.

The purpose of use of this pointer attribute will be described below.

When the structured document transformation apparatus 5 transforms the document structure of an XML document sent from the structured document distribution apparatus 1 using transformation rules, an XML document obtained by transformation does not contain a partial document deleted upon transformation. Hence, information contained in the XML document sent from the structured document distribution apparatus 1 can be categorized into information which is also contained in the XML document after document structure transformation, and information which is not contained in the XML document after document structure transformation.

When a new XML document is obtained by editing the transformed XML document at a given structured document browse/edit apparatus 12, only the information also contained in the XML document after transformation of that contained in the XML document sent from the structured document distribution apparatus 1 has been actually edited. In this case, the user has made that edit process for either of two purposes: he or she has changed the information also contained in the XML document after transformation of that contained in the XML document sent from the structured document distribution apparatus 1, or he or she has made that change to set information which is not currently contained in the XML document after transformation of that contained in the XML document sent from the structured document distribution apparatus 1 to be information also contained in a structured document after transformation upon transforming the next XML document sent from the structured document distribution apparatus 1 by the structured document transformation apparatus 5.

Such edit processes will be explained below with reference to FIGS. 22A–22E.

For example, the following XML document that expresses personal information will be examined.

```
<personal_information id="pi1">
    <name id="pi2">A1</name>
    <e-mail id="pi3" display="true">A2</e-mail>
    <telephone_number id="pi4" display="false">111-1111</telephone_number>
</personal_information>
```

This XML document has a document structure having elements "name", "e-mail", and "telephone number" as child elements, as shown in FIG. 22A. Since element "e-mail" is assigned pointer attribute value "true" (to be simply expressed as "T" hereinafter), and element "telephone number" is assigned pointer attribute value "false" (to be simply expressed as "F" hereinafter), it is pre-set that element "telephone number" of a partial document including "e-mail" and "telephone number" is to be deleted.

Assume that this XML document is transformed using the following transformation rules:

Transformation rule R301: change path "e-mail (display="true")/$1" to path "e-mail/$1".

Transformation rule R302: delete path "e-mail (display="false")/$1".

Transformation rule R303: change path "telephone number (display="true")/$1" to path "telephone number/$1".

Transformation rule R304: delete path "telephone number (display="false")/$1".

Note that attribute information assigned to each element is described in ( ) in the description of transformation rules. Then, a partial document including "telephone number" is deleted based on the above pointer attribute value, and an XML document with a document structure shown in FIG. 22B is obtained. The XML document at this time is as follows:

```
<personal_information id="pi1">
    <name id="pi2">A1</name>
    <e-mail id="pi3">A2</e-mail>
</personal_information>
```

Transformation records obtained upon transforming the document structure of the XML document using transformation rules R301 to R304 above are as follows:

Transformation record M301: transformation rule R301 was applied to a path having an element with element identifier "pi3" as the last element.

Transformation record M302: transformation rule R302 was not applied.

Transformation record M303: transformation rule R303 was not applied.

Transformation record M304: transformation rule R304 was applied to a path having an element with element identifier "pi4" as the last element.

Subsequently, assume that the user has rewritten a partial document including "e-mail" to a partial document including "telephone number" as follows in the edit process of the XML document after transformation at the structured document browse/edit apparatus 12 (see FIG. 22C).

```
<personal_information id="pi1">
    <name id="pi2">A1</name>
    <telephone_number>111-1111</telephone_number>
</personal_information>
```

The backward transformation process by applying transformation records M301 to M304 to the XML document one by one from the bottom will be described below.

(1) With reference to transformation record M304, a partial document (<telephone_number id="pi4" contact="false">111-1111</telephone_number>) that was deleted upon application of transformation rule R304 is restored. As a result, as shown in FIG. 22D, a partial document including "telephone number" which was deleted upon forward transformation is restored (in this case, the element identifier and pointer attribute value are restored as they were), thus obtaining the following XM1L document:

```
<personal_information id="pi1">
    <name id="pi2">A1</name>
    <telephone_number>111-1111</telephone_number>
    <telephone_number id="pi4" contact="false">111-1111</telephone_number>
</personal_information>
```

(2) Transformation record M303 is referred to. Although transformation rule R303 was not applied upon forward transformation, the XML document includes element "telephone number" which is to be generated by forward transformation corresponding to transformation rule R303. However, element "telephone number" is not assigned any pointer attribute value described in transformation rule R303. Hence, in this case, a pointer attribute ("display="true"") to that element "telephone number" (see FIG. 22E). In this case, transformation rule R303 which was not used in forward transformation is used in backward transformation. As a result, the following XML document is obtained.

```
<personal_information id="pi1">
    <name id="pi2">A1</name>
    <telephone_number contact="true">111-1111</telephone_number>
        <telephone_number id="pi4" contact="false">111-1111</telephone_number>
```

(3) Transformation record M302 is referred to. In this case, since transformation rule R302 was not applied, no process is done in practice.

(4) Backward transformation is made with reference to transformation record M301. However, since the XML document contains neither element "e-mail" which is to be generated by forward transformation corresponding to transformation rule R301 nor an element having element identifier "id3", no process is done in practice.

The backward transformation result of the XML document using all transformation records M301 to M304 is as follows (see FIG. 22E).

```
<personal_information id="pi1">
    <name id="pi2">A1</name>
    <telephone_number contact="true">111-1111</telephone_number>
        <telephone_number id="pi4" contact="false">111-1111</telephone_number>
```

This XML document has two partial documents including building elements having pointer attributes and the same element values and names, i.e., elements

```
"telephone number"(<telephone_number
contact="true">111-1111</telephone_number>, and
<telephone_number id="pi4" contact="false">111-1111</telephone_number>).
```

In this way, as a result of backward transformation, if one XML document has a plurality of partial documents including building elements having pointer attributes and the same element values and names, it is determined that the XML document is not the one which is to be finally reflected in the structured document distribution apparatus 1, but the purpose of the edit process done on the structured document browse/edit apparatus 12 is to finally reflect the following XML document in the structured document distribution apparatus 1.

```
<personal_information id="pi1">
    <name id="pi2">A1</name>
    <e-mail id="pi3" display="true">A2</e-mail>
    <telephone_number id="pi4" display="false">111-1111</telephone_number>
</personal_information>
```

That is, since the user who made the above edit process wants to change a partial document to be left without deletion upon forward transformation from a partial document including "e-mail" to that including "telephone number", it is determined that a process for changing a pointer attribute value (such process will be referred to as fine adjustment or a fine adjustment process hereinafter) is required. That is, by executing the fine adjustment process, attribute information "display="true"" is assigned to element "e-mail", and attribute information "display="true"" is assigned to element "telephone number".

Figure 23:
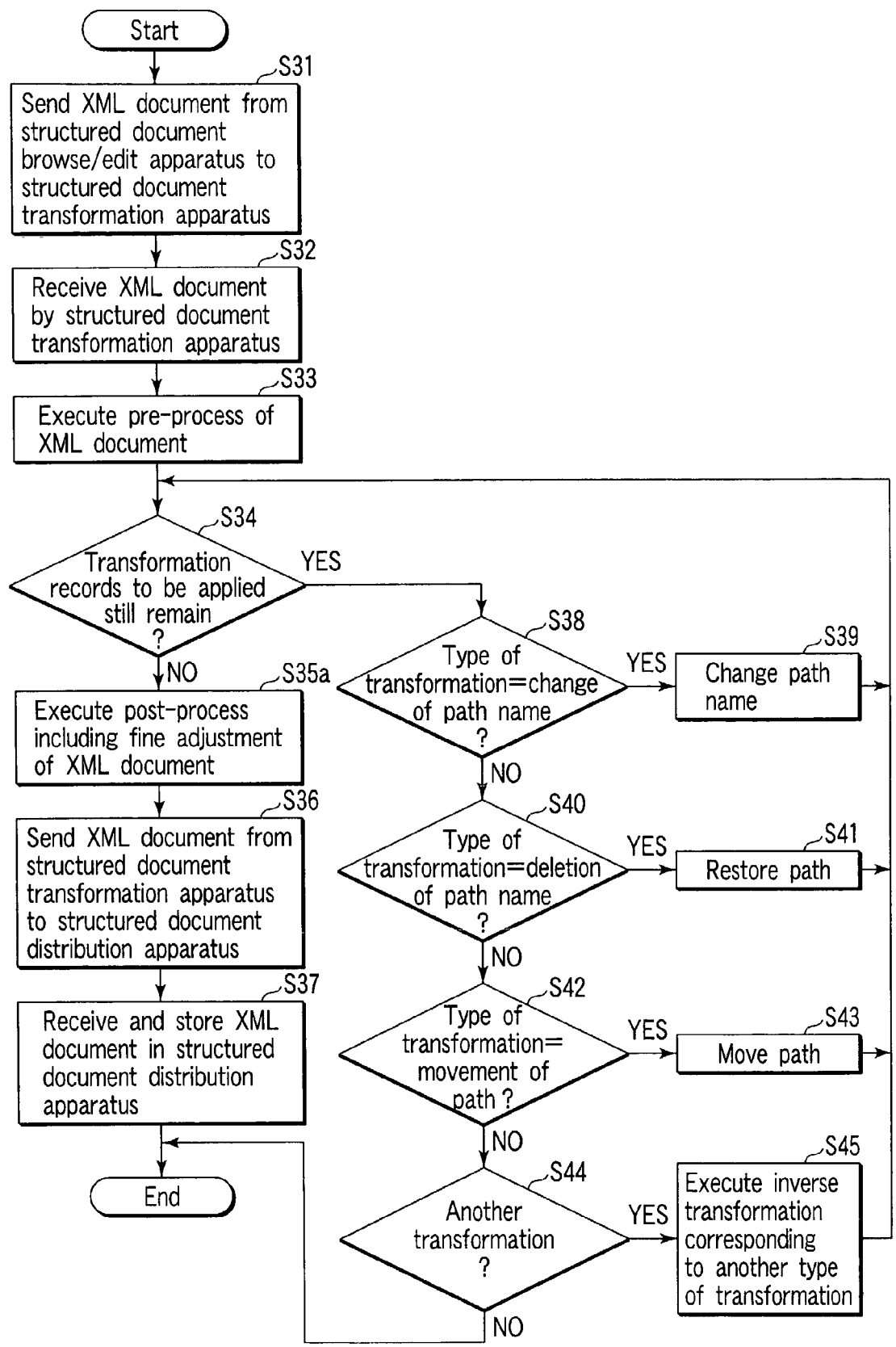
FIG. 23 is a flow chart for mainly explaining the processing operation of a backward transformation execution unit of a structured document transformation apparatus.

FIG. 23 is a flow chart for mainly explaining the processing operation of the backward transformation execution unit 7 of the structured document transformation apparatus 5 according to the second embodiment. Note that only steps different from FIG. 4 will be explained in FIG. 23. That is, step S35 in FIG. 4 is replaced by step S35a in FIG. 23.

In step S35a in FIG. 23, upon completion of backward transformation, if one XML document includes a plurality of partial documents which have pointer attributes and element names with the same values as a result of backward transformation, the backward transformation execution unit 7 makes fine adjustment to change pointer attribute values according to the aforementioned user's intention.

The fine adjustment process will be described below with reference to the flow chart shown in FIG. 24.

If a structured document after backward transformation includes the same partial document (a partial document having the same document structure, element names, and element values) as a partial document deleted by deletion of a path (added by backward transformation) upon forward transformation, (step S51), a pointer attribute value in the partial document added by backward transformation is changed (step S52).

The edited partial document is restored to a state before edit, and a pointer attribute value in that partial document is changed (step S53).

The fine adjustment process will be explained below using the XML document presented previously, i.e.,. the following XML document.

```
<personal_information id="pi1">
    <name id="pi2">A1</name>
    <e-mail id="pi3" display="true">A2</e-mail>
    <telephone_number id="pi4" display="false">111-1111</telephone_number>
</personal_information>
```

After the above XML document has undergone the edit process, backward transformation is made using transformation records M301 to M304 to obtain the following XML document, as described above.

```
<personal_information id="pi1">
    <name id="pi2">A1</name>
    <telephone_number display="true">111-1111</telephone_number>
        <telephone_number id="pi4" display="false">111-1111</telephone_number>
```

This XML document is searched for a partial document which matches the partial document deleted upon forward transformation (added upon backward transformation), i.e., path "telephone number/111-1111". As a result of search, it is confirmed that the same partial document is present. The confirmed partial document is:

```
<telephone_number display="true">111-
1111</telephone_number>
```

Hence, the pointer attribute of the partial document added (restored) by backward transformation, that is:

```
<telephone_number id="pi4" display="false">111-
1111</telephone_number>
is changed to "true".
```

Furthermore, the partial document that has been edited at the structured document browse/edit apparatus 12, that is:

```
<telephone_number display="true">111-
1111</telephone_number>
``` is restored to a state before that edit process, that is:
 <e-mail id="pi3" display="true">A2</e-mail>

Furthermore, the pointer attribute value is changed to "false".

As a result, the following XML document with rewritten pointer attribute values, which were set in elements "e-mail" and "telephone number" when it was read out from the structured document distribution apparatus 1, is obtained:

```
<personal_information id="pi1">
    <name id="pi2">A1</name>
    <e-mail id="pi3" display="false">A2</e-mail>
    <telephone_number id="pi4" display="true">111-
1111</telephone_number>
</personal_information>
```

In this manner, when a plurality of structured document transformation records can be applied to a specific path in an XML document upon backward transformation using the transformation records, the transformation records are applied according to the priority order defined by the transformation rule group, and the fine adjustment is required when an element associated with a pointer attribute has been edited on the structured document browse/edit apparatus 12.

The forward and backward transformation processes of an actual XML document in the structured document transformation apparatus 5 will be explained below.

Assume that an XML document shown in FIG. 27 is sent from the storage unit 2 to the structured document transformation apparatus 5.

The XML document received by the structured document transformation apparatus 5 undergoes a pre-process for transforming its document structure to a format suitable for transformation using transformation rules prior to transformation using transformation rules. Upon executing the pre-process, transformation must be done within a range in which semantic combinations held by the source XML document are prevented from corrupting.

Transformation rules are applied to the pre-processed XML document to obtain an XML document in a format suitable for use at the structured document browse/edit apparatus 12. FIG. 25 shows a transformation rule set used in this transformation. As shown in FIG. 25, transformation rules R405 and R406 are defined as transformation rule group G5, and it is pre-set that transformation rule R405 is used preferentially upon backward transformation. Note that "$+numerical value" indicates a variable in the description of transformation rules shown in FIG. 25.

Figure 28:
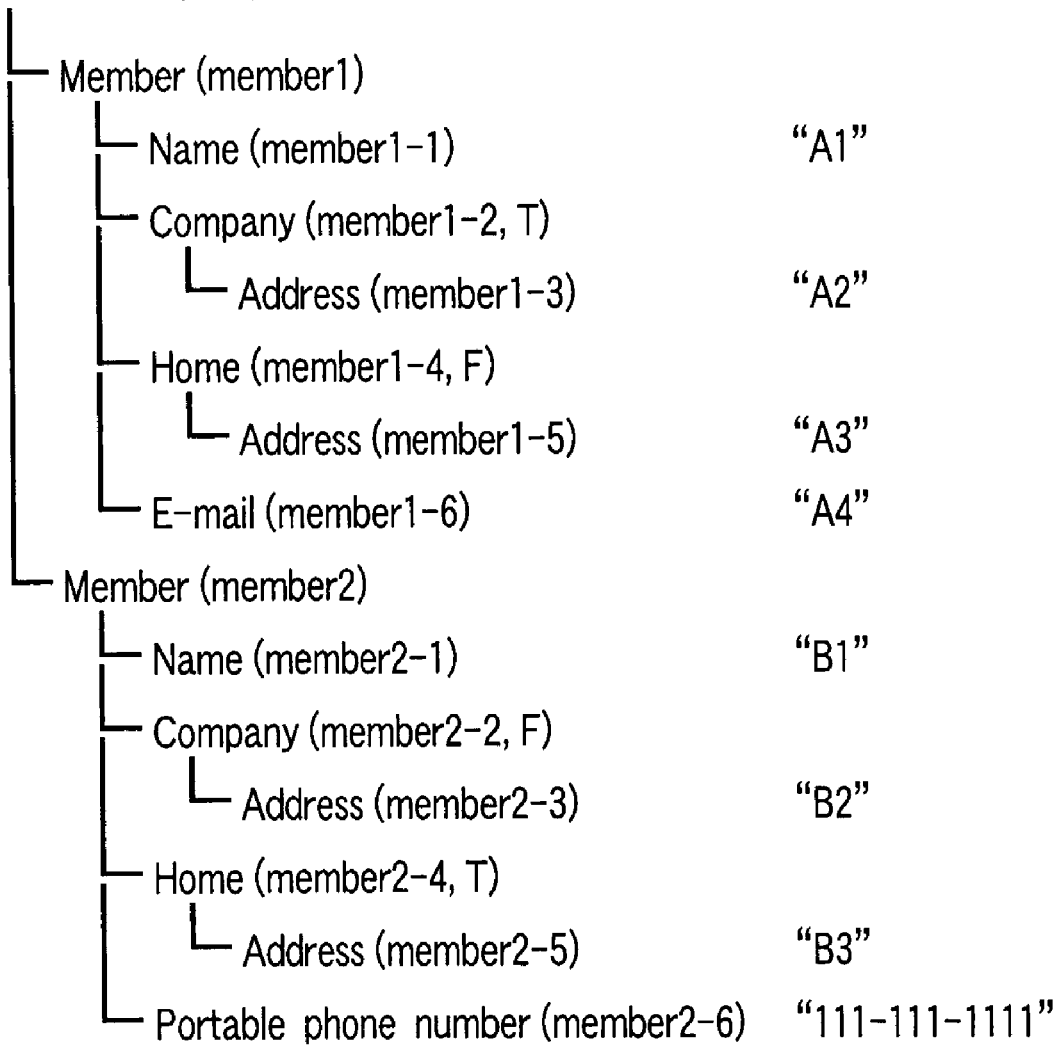
FIG. 28 shows the document structure of the XML document shown in FIG. 27.

The XML document that expresses "address book" information shown in FIG. 27 has a document structure including "member" information for two persons, as shown in FIG. 28. In FIG. 28, element identifiers and pointer attributes of respective building elements are described in ( ).

FIG. 26 shows transformation records obtained as a result of application of the transformation rule set shown in FIG. 25 to the XML document shown in FIG. 27.

Forward transformation using the transformation rule set shown in FIG. 25 will be briefly explained below. When transformation rules R401 to R404 shown in FIG. 25 are applied in the order named, one, which is set with pointer attribute value "true" of a partial document designated by path name "company/address" and a partial document designated by path name "home/address" in each "member" information is left, and the other is deleted. The pointer attribute of the left partial document is deleted. By applying transformation rule R405, a partial document including "e-mail" is changed to a partial document including "contact address", and by applying transformation rule R406, a partial document including "portable phone number" is changed to a partial document including "contact address". As a result of such transformation, an XML document with a document structure shown in FIG. 30 is obtained.

The XML document, the document structure of which has been transformed using the transformation rules, as shown in FIG. 30, undergoes a post-process to be transformed into a format suitable for the browse/edit process at the structured document browse/edit apparatus 12.

Figure 31:
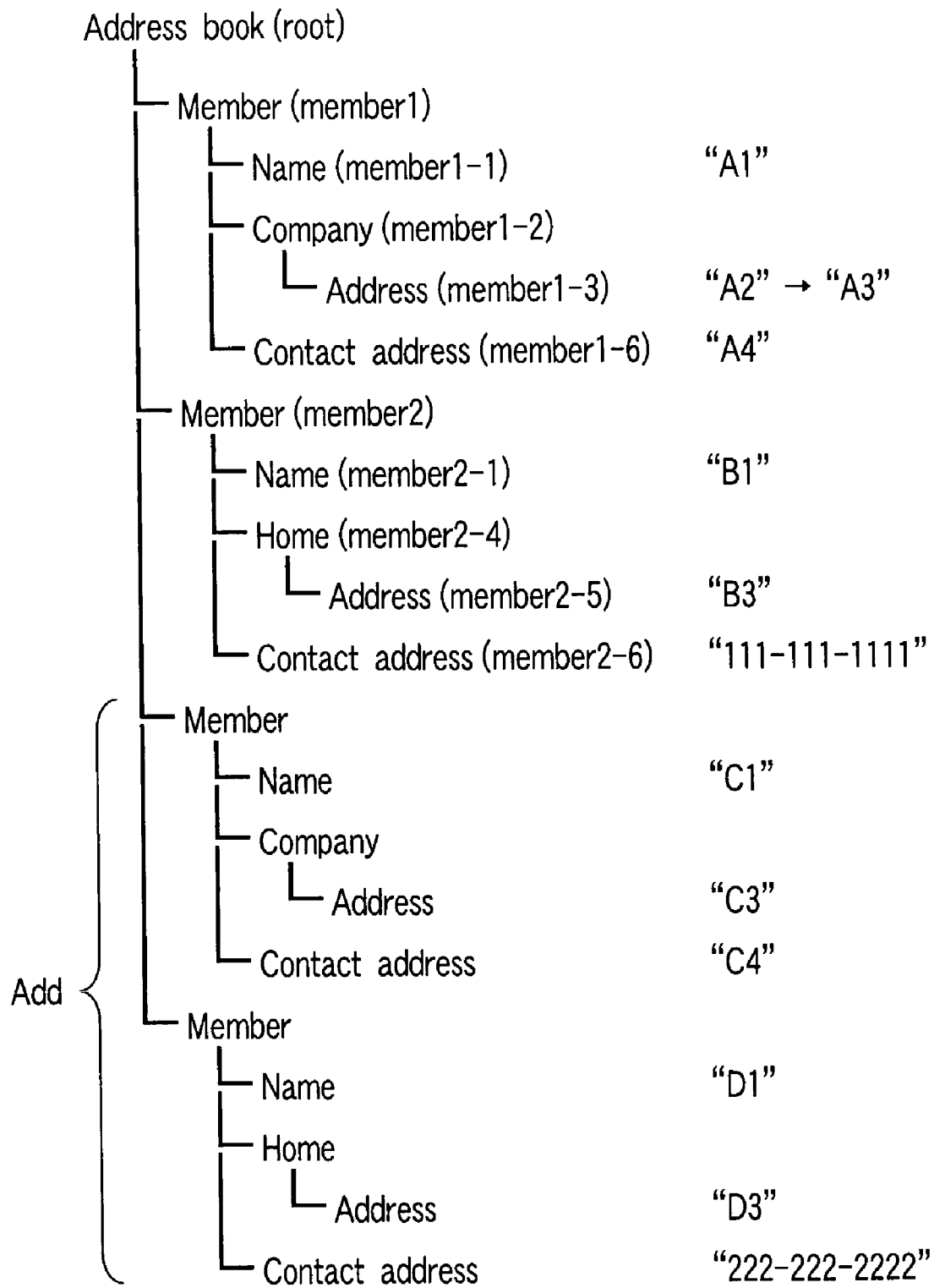
FIG. 31 is a view for explaining the edit contents of the XML document shown in FIG. 29.

The user browses and edits the post-processed XML document on the structured document browse/edit apparatus 12 to obtain a new XML document. In this case, assume that an edit process for changing value "A2" of element "address" in a partial document including elements with element identifier "member1" to "A3", and an edit process for adding two new members have been done, as shown in FIG. 31.

The XML document that has been edited at the structured document browse/edit apparatus 12 is sent to the structured document transformation apparatus 5. The structured document transformation apparatus pre-processes that XML document to a format suitable for transformation using transformation records prior to backward transformation using transformation records.

Figure 32:
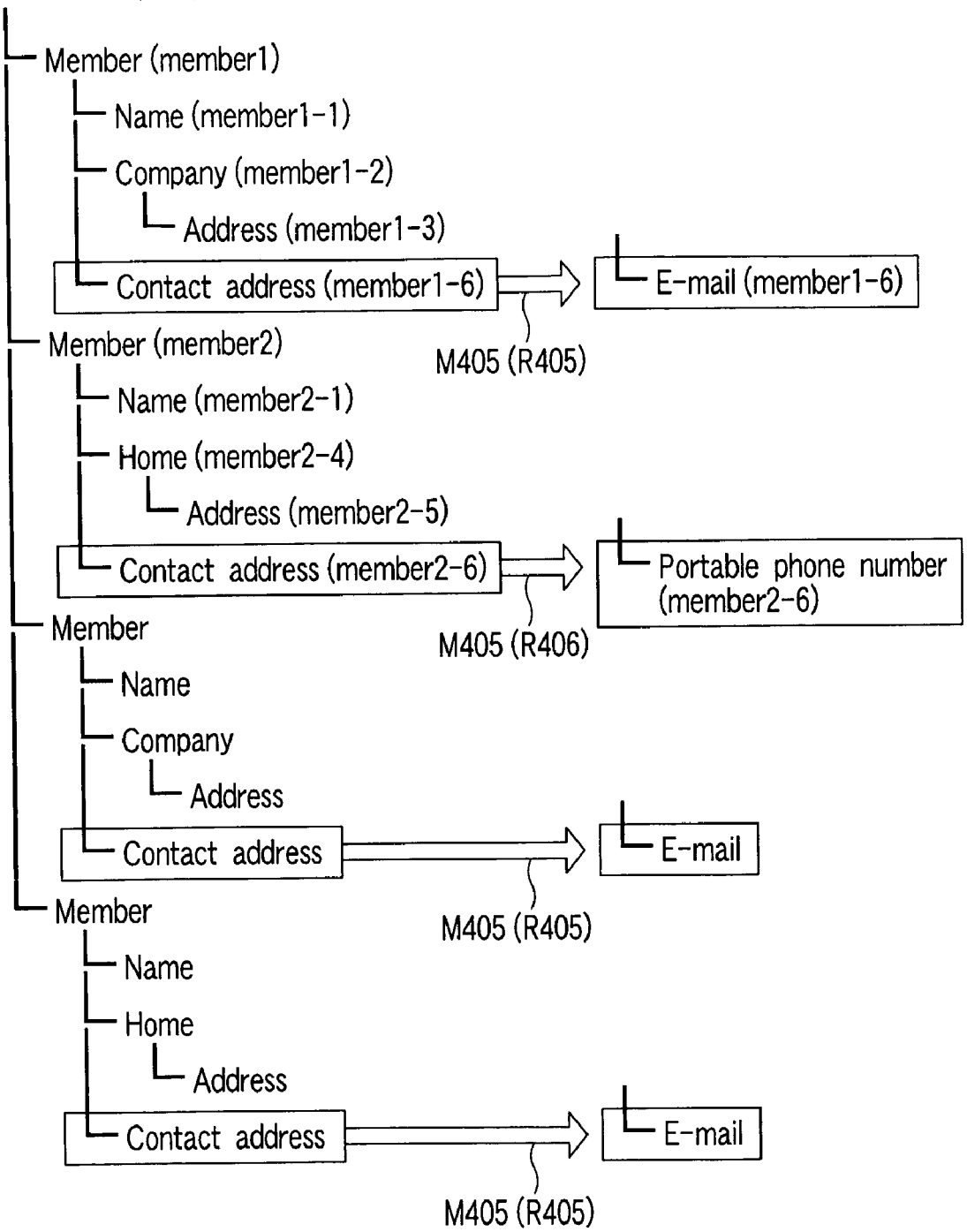
FIG. 32 is a view for explaining the process of changes in XML document upon applying the transformation records one by one.

Upon completion of the pre-process of the XML document, the transformation records which are managed by the transformation record management unit 11, as shown in FIG. 26, are checked in turn from the bottom, and backward transformation corresponding to transformation recorded in the transformation records is executed. The process of changes in XML document upon applying the transformation records one by one will be explained below with reference to FIGS. 32 to 34.

(1) Backward transformation corresponding to transformation record M405 is executed. Transformation record M405 includes both records associated with application of transformation rules R405 and R406, and it is defined that transformation rule R405 of these two transformation rules is preferentially used (see FIG. 25). Hence, an element with element identifier "member1-6" undergoes backward transformation of transformation rule R405, and an element with element identifier "member2-6" then undergoes backward transformation of transformation rule R406 (see FIG. 32).

A partial document including "contact address" in "member" information in which "name" has value "C1", and a partial document including "contact address" in "member" information in which "name" has value "D1" then undergo backward transformation. Upon backward transformation, these partial documents match both backward transformations corresponding to transformation rules R405 and R406, and backward transformation corresponding to transformation rule R405, which is designated to be used preferentially, of these two transformation rules, is executed. As a result, the partial document including "contact address" in each "member" information is changed to a partial document including "e-mail" (see FIG. 32).

Figure 33:
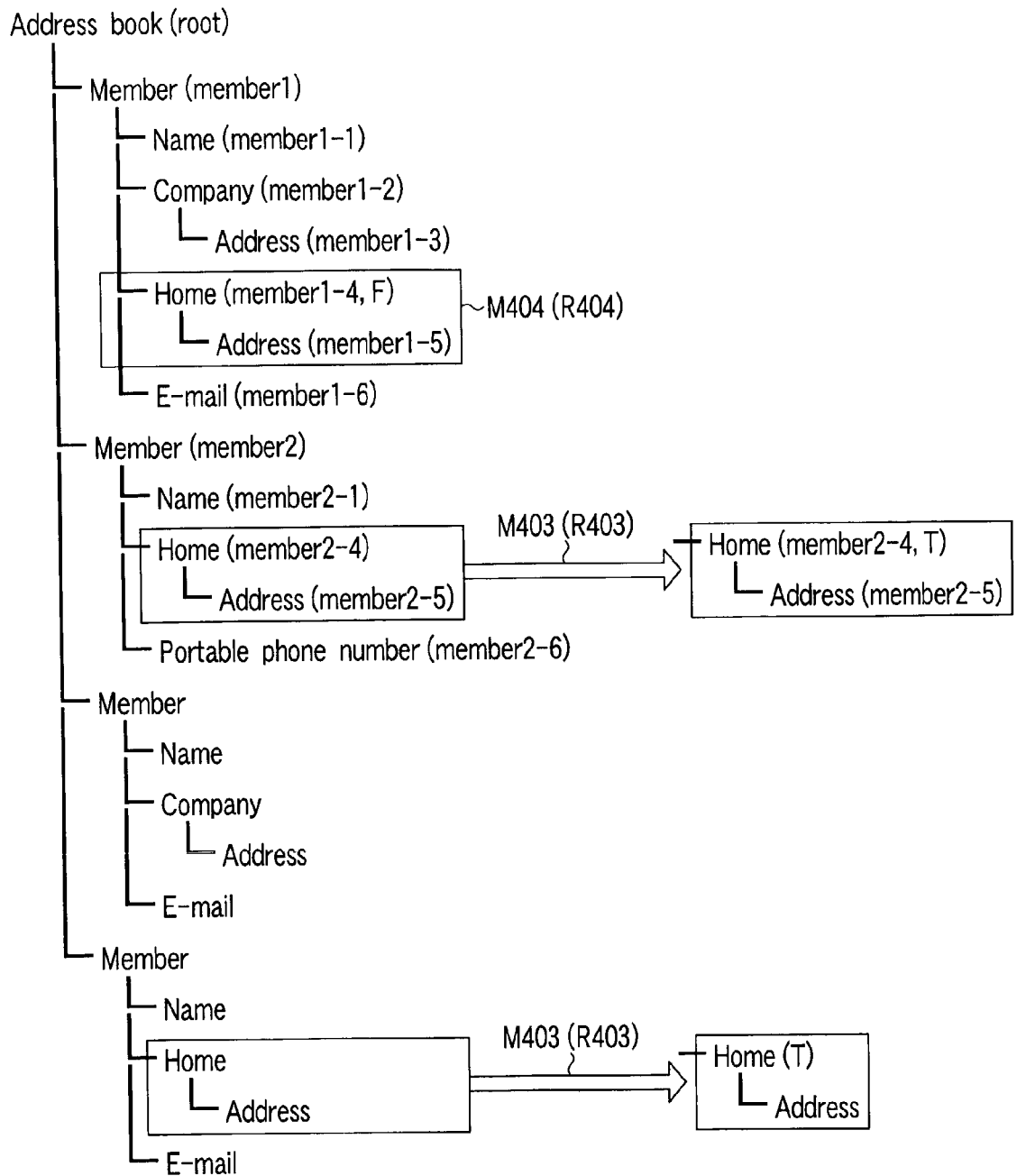
FIG. 33 is a view for explaining the process of changes in XML document upon applying the transformation records one by one.

(2) Backward transformation corresponding to transformation record M404 is executed. That is, a partial document including an element with element identifier "member1-4" is restored, as shown in FIG. 33.

(3) Backward transformation corresponding to transformation record M403 is executed. In this case, as shown in FIG. 33, in addition to a partial document having an element with element identifier "member2-5" as the last element, "member" information in which element "name" has value "D1" also undergoes backward transformation. As a result, pointer attribute "true" is set in element "home" having element identifier "member2-4", and pointer attribute "true" is also set in element "home" in new "member" information added by the edit process.

(4) Backward transformation corresponding to transformation record M402 is executed. That is, a partial document including an element with element identifier "member2-2" is restored, as shown in FIG. 34.

(5) Backward transformation corresponding to transformation record M401 is executed. In this case, as shown in FIG. 34, in addition to a partial document having an element with element identifier "member1-3" as the last element, "member" information in which element "name" has value "C1" also undergoes backward transformation. As a result, pointer attribute "true" is set in element "company" having element identifier "member1-2", and pointer attribute "true" is also set in element "company" in new "member" information added by the edit process.

In this way, backward transformation of the XML document using the transformation records is complete.

Figure 34:
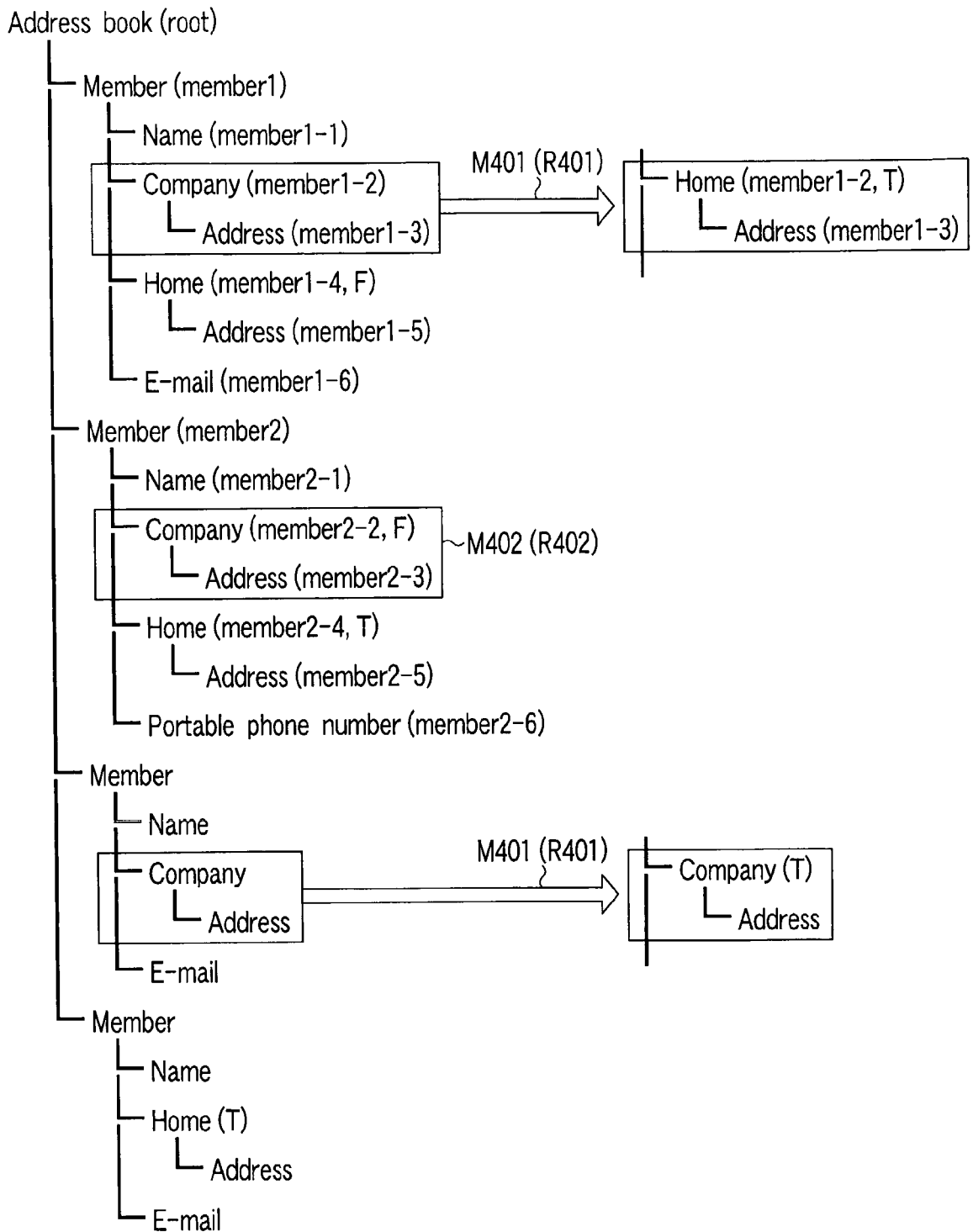
FIG. 34 is a view for explaining the process of changes in XML document upon applying the transformation records one by one.
Figure 35:
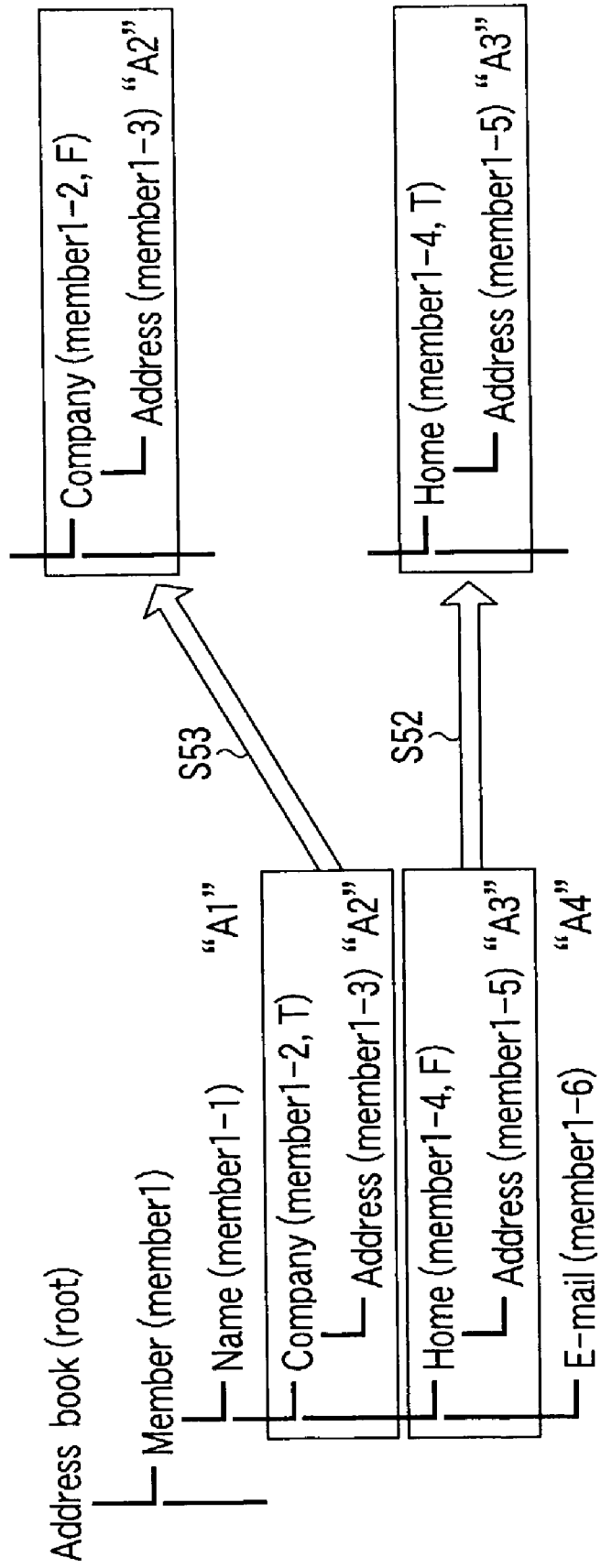
FIG. 35 is a view for explaining a fine adjustment process.

As can be seen from FIG. 34, this XML document includes two partial documents which have pointer attributes, and have element names with the same values: that is, a partial document including "address" in a partial document including "company", and a partial document including "address" in a partial document including "home", which are present in "member" information, which is made up of building elements with element identifiers "member1", as shown in FIG. 35.

Finally, the XML document undergoes fine adjustment. This process will be explained using FIG. 24. The pointer attribute value in a partial document added (restored) by backward transformation, i.e., a partial document including "home", as shown in FIG. 35, is changed to "true" (step S52). Then, a partial document edited at the structured document browse/edit apparatus 12, i.e., a partial document including "company" is restored to a state before the edit process, i.e., the value of element "company" is restored from "A3" to "A2". Furthermore, the pointer attribute value is changed to "false" (step S53).

The XML document that has undergone fine adjustment, as described above, is then post-processed to a format suitable for storage in the structured document distribution apparatus 1.

In this process, new elements created by the user's edit process are not assigned any identifiers. The write unit 4 assigns unique identifiers to elements to which no identifiers are assigned. In an XML document shown in FIG. 36, identifiers are assigned to all elements. This XML document is to be finally stored in the structured document distribution apparatus.

As described above, according to the first and second embodiments, a desired one of a plurality of structured documents with different document structures is transformed to a document structure compatible to a given use mode in accordance with transformation rules compatible to that use mode of the structured document, which are determined in advance for each document structure. In this case, a transformation record which records a partial document in the structured document to which a given transformation rule was applied, and the transformation rule applied to that partial document, is stored. A structured document obtained as a result of an edit process of the structured document, the document structure of which has been transformed in correspondence with the use mode, is transformed to a source document structure on the basis of the transformation records and transformation rules. In this way, a structured document with a given document structure can be easily transformed into a plurality of different document structures compatible to the use modes of that structured document, or different document structures compatible to different use modes can be easily transformed into an original document structure.

The method of the present invention described in the above embodiment may be stored in a recording medium such as a magnetic disk (floppy disk, hard disk, or the like), an optical disk (CD-ROM, DVD, or the like), a semiconductor memory, or the like, as a program that can be executed by a computer, and such recording medium can be distributed. More specifically, all the units of the structured document distribution apparatus 1 except for the storage unit 2, those of the structured document transformation apparatus 5, and those of the structured document browse/edit apparatus 12 can be implemented as programs that can be executed by the computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of managing document information transfers between a server and at least one of a plurality of clients, the server performing bidirectional transformation between a first structured document having a first server-compatible format and a second structured document having a second format, the second format being a client-compatible format and being one of a plurality of formats employed by the plurality of clients, wherein the first structured document and the second structured document each includes elements, comprising:

in response to a request from the at least one of the plurality of cliens, the server:

preparing a transformation rule having primitive rules each of which is applicable to respective one of the elements specified in units of paths within the first structured document, wherein the units of paths are paths names designating specific areas in the first structure document;

detecting an important element within the elements of the first structured document, wherein the important element holds a semantic combination;

performing a forward transformation which transforms the first structured document into the second structured document in accordance with the transformation rule;

controlling the forward transformation to prevent the removal of the important element during the forward transformation;

creating a transformation record wherein the primitive rules that were applied and the paths that were transformed in the forward transformation are recorded; and the server:

transferring the second structured document to the at least one client;

the at least one client:

editing the second structured document; and transferring the edited second structured document to the server; and the server:

performing a backward transformation which transforms the edited second structured document into the first structured document while referring to the transformation record, the transformation rule, and the first structured document.

2. The method according to claim 1, wherein the controlling includes invalidating a primitive rule that removes the important element in the transformation rule before the forward transformation is performed.

3. The method according to claim 1, wherein the primitive rules include at least deleting or renaming the elements from the first structured document.

4. The method according to claim 1, wherein at least one of identifiers of the elements of the first structured document is succeeded to the elements of the second structured document during the forward transformation.

5. The method according to claim 1, further comprising:

defining an arbitrary transformation rule group, wherein a plurality of primitive rules which may generate the same paths are combined, and priority is set to one of the primitive rules which is to be used during the backward transformation.

6. The method according to claim 1, wherein the elements is applied with pointer attributes used for selecting specific elements before the forward transformation and after the backward transformation.

7. A structured document transforming apparatus that manages document information transfers between a server and at least one of a plurality of clients, the structured document transforming apparatus performing bidirectional transformation between a first structured document having a first server-compatible format and a second structured document, having a second format, the second format being a client-compatible format and being one of a plurality of formats employed by the plurality of clients wherein the first structured document and the second structured document each includes elements, comprising:

a detector configured to detect a request from the at least one of the plurality of clients;

a storage configured to store a transformation rule having primitive rules each of which being applicable to a respective one of the elements specified in units of paths within the first structured document in response to the request, wherein the units of paths are path names designating specific areas in the first structured document;

a detector configured to detect an important element within the elements of the first structured document in response to the request, wherein the important element holds a semantic combination;

a forward transformer configured to perform a forward transformation which transforms the first structured document into the second structured document in accordance with the transformation rule;

a controller configured to control the forward transformation to prevent the removal of the important element during the forward transformation;

a creating device configured to create a transformation record wherein the primitive rules that were applied and the paths that were transformed in the forward transformation are recorded;

a transfer device configured to transfer the second structured document to the at least one client for editing; and a backward transformer configured to perform a backward transformation which transforms the edited second structured document into the first structured document with referral to the transformation record, the transformation rule, and the first structured document.

8. The apparatus according to claim 7, wherein the controller includes an invalidator configured to invalidate a primitive rule that removes the important element in the transformation rule before the forward transformation is performed.

9. The apparatus according to claim 7, wherein the primitive rules include at least deleting or renaming the elements from the first structured document.

10. The apparatus according to claim 7, wherein at least one of identifiers of the elements of the first structured document is succeeded to the elements of the second structured document during the forward transformation.

11. The apparatus according to claim 7, further comprising:

a defining device configured to define an arbitrary transformation rule group, wherein a plurality of primitive rules which may generate the same paths are combined, and priority is set to one of the primitive rules which is to be used during the backward transformation.

12. The apparatus according to claim 7, wherein the elements are applied with pointer attributes used for selecting specific elements before the forward transformation and after the backward transformation.

13. A computer program product embodied on a computer readable medium that manages document information transfers between a server and at least one of a plurality of clients, the computer program product performing bidirectional transformation between a first structured document having a first server-compatible format and a second structured document, having a second format, the second format being a client-compatible format and being one of a plurality of formats employed by the plurality of clients, wherein the first structured document and the second structured document each includes elements, and wherein the bidirectional transformation uses a transformation rule having primitive rules each of which is applicable to a respective one of the elements specified in units of paths within the first structured document, comprising:

a code segment that detects a request from the at least one of the plurality of clients;

a code segment that detects an important element within the elements of the first structured document in response to the request, wherein the important element holds a semantic combination;

a code segment that performs a forward transformation which transforms the first structured document into the second structured document in accordance with the transformation rule;

a code segment that controls the forward transformation to prevent the removal of the important element during the forward transformation;

a code segment that creates a transformation record wherein the primitive rules that were applied and the units of paths that were transformed in the forward transformation are recorded, wherein the units of paths are path names designating specific areas in the first structured document;

a code segment that transfers the second structured document to the at least one client for editing; and a code segment that performs a backward transformation which transforms the edited second structured document into the first structured document with referral to the transformation record, the transformation rule, and the first structured document.

14. The computer program product according to claim 13, wherein the code segment that controls the forward transformation includes a code segment that invalidates a primitive rule that removes the important element in the transformation rule before the forward transformation is performed.

15. The computer program product according to claim 13, wherein the primitive rules include at least deleting or renaming the elements from the fist structured document.

16. The computer program product according to claim 13, wherein at least one of identifiers of the elements of the first structured document is succeeded to the elements of the second structured document during the forward transformation.

17. The computer program product according to claim 13, further comprising:

a code segment that defines an arbitrary transformation rule group, wherein a plurality of primitive rules which may generate the same paths are combined, and priority is set to one of the primitive rules which is to be used during the backward transformation.

18. The computer program product according to claim 13, wherein the elements are applied with pointer attributes used for selecting specific elements before the forward transformation and after the backward transformation.

* * * * *

UNITED STATES PATENT AND TRADEMARK OFFICE
CERTIFICATE OF CORRECTION

| | | |
|---|---|---|
| PATENT NO. | : 7,073,120 B2 | Page 1 of 1 |
| APPLICATION NO. | : 10/151164 | |
| DATED | : July 4, 2006 | |
| INVENTOR(S) | : Torii et al. | |

It is certified that error appears in the above-identified patent and that said Letters Patent is hereby corrected as shown below:

Column 37, line 8, change "structure" to --structured--.

Column 37, line 52, change "is applied" to --are applied--.

Signed and Sealed this

Seventeenth Day of October, 2006

JON W. DUDAS
*Director of the United States Patent and Trademark Office*